(12) United States Patent
Micanek et al.

(10) Patent No.: US 10,302,011 B2
(45) Date of Patent: May 28, 2019

(54) EXHAUST GAS VARIABLE TURBINE ASSEMBLY

(71) Applicant: Garrett Transportation I Inc., Torrance, CA (US)

(72) Inventors: Vit Micanek, Brno (CZ); Gary Agnew, Brno (CZ); Nicolas Morand, Deyvillers (FR); Jan Musil, Brno (CZ); Francis Abel, La Baffe (FR)

(73) Assignee: Garrett Transportation I Inc., Torrance, CA (US)

( * ) Notice: Subject to any disclaimer, the term of this patent is extended or adjusted under 35 U.S.C. 154(b) by 422 days.

(21) Appl. No.: 14/949,275

(22) Filed: Nov. 23, 2015

(65) Prior Publication Data

US 2017/0145912 A1 May 25, 2017

(51) Int. Cl.
*F02B 37/24* (2006.01)
*F01D 17/16* (2006.01)
*F01D 25/00* (2006.01)

(52) U.S. Cl.
CPC ............ *F02B 37/24* (2013.01); *F01D 17/165* (2013.01); *F01D 25/005* (2013.01); *F05D 2220/40* (2013.01); *F05D 2230/23* (2013.01); *F05D 2240/128* (2013.01); *F05D 2240/14* (2013.01); *F05D 2240/30* (2013.01); *F05D 2300/17* (2013.01); *Y02T 10/144* (2013.01)

(58) Field of Classification Search
CPC .... F02B 37/24; F01D 17/165; F01D 258/005; F05D 2240/128; F05D 2240/14; F05D 2240/30; F05D 2220/40; F05D 2300/17
See application file for complete search history.

(56) References Cited

U.S. PATENT DOCUMENTS

| | | | | |
|---|---|---|---|---|
| 4,741,666 A | * | 5/1988 | Shimizu | F01D 17/165 415/158 |
| 6,984,104 B2 | * | 1/2006 | Alexander | F01D 17/162 415/159 |
| 7,125,222 B2 | * | 10/2006 | Cormier | F01D 17/162 415/160 |
| 7,614,846 B2 | * | 11/2009 | Foucher | F01D 17/162 415/161 |

(Continued)

FOREIGN PATENT DOCUMENTS

| | | |
|---|---|---|
| EP | 1422400 B1 | 12/2011 |
| GB | 2467382 A | 8/2010 |
| WO | 2015092843 A1 | 6/2015 |

OTHER PUBLICATIONS

EP Application No. 16196438.2-1610, Extended European Search Report (11 pages).

(Continued)

*Primary Examiner* — Carlos A Rivera
*Assistant Examiner* — Adam W Brown
(74) *Attorney, Agent, or Firm* — Brian J. Pangrle

(57) ABSTRACT

An exhaust gas variable geometry turbine assembly can include a number of pivotable vanes that define throats within an exhaust gas nozzle where each of the pivotable vanes includes a corresponding post, where each of the pivotable vanes is made of a first alloy that includes a first amount of nickel by mass, where each of the corresponding posts is made of a second alloy that includes a second amount of nickel by mass and where the second amount of nickel by mass exceeds the first amount of nickel by mass.

4 Claims, 16 Drawing Sheets

(56) References Cited

U.S. PATENT DOCUMENTS

| | | | | |
|---|---|---|---|---|
| 2002/0154991 | A1* | 10/2002 | Bowen | F01D 11/001 |
| | | | | 415/160 |
| 2005/0008489 | A1* | 1/2005 | Perruchaut | F01D 17/16 |
| | | | | 416/160 |
| 2006/0029494 | A1 | 2/2006 | Bruce | |
| 2006/0110246 | A1* | 5/2006 | Bruce | F01D 17/162 |
| | | | | 415/160 |
| 2007/0160464 | A1* | 7/2007 | Lesnevsky | C23C 4/04 |
| | | | | 415/160 |
| 2011/0110783 | A1* | 5/2011 | Addis | B23P 6/005 |
| | | | | 416/219 R |
| 2011/0296895 | A1 | 12/2011 | Matsuyama et al. | |
| 2014/0169950 | A1* | 6/2014 | Dube | F01D 17/162 |
| | | | | 415/160 |
| 2017/0022891 | A1 | 1/2017 | Arai et al. | |

OTHER PUBLICATIONS

Mamesta, Nitriding / Nitrocarburising, 2011 (2 pages).

Zhao et al., Understanding of the Interaction between Clearance Leakage Flow and Main Passage Flow in a VGT Turbine, Advances in Mechanical Engineering, Article ID 652769, Dec. 2014 (11 pages).

ASM International, Introduction to Nitriding, Chapter 1, 2003 (12 pages).

\* cited by examiner

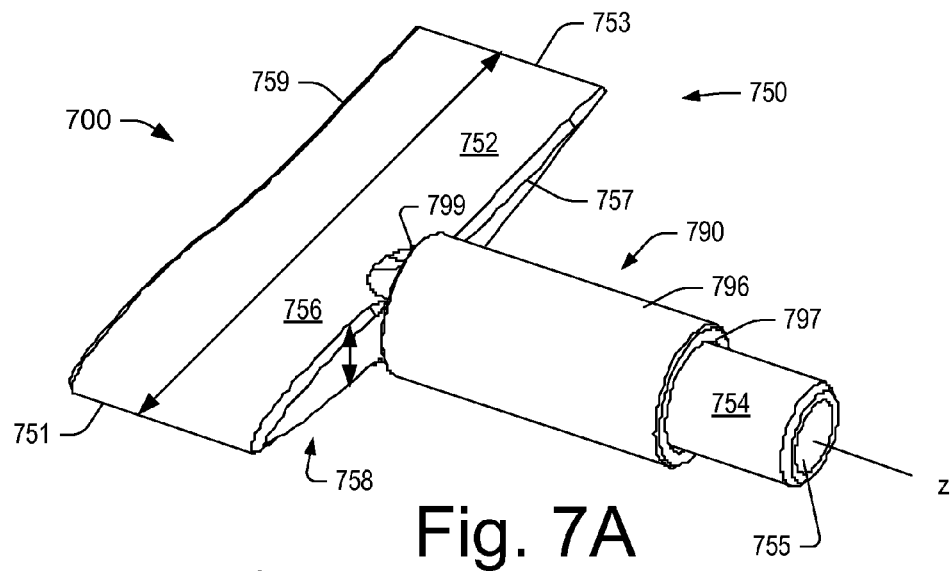
Fig. 7A
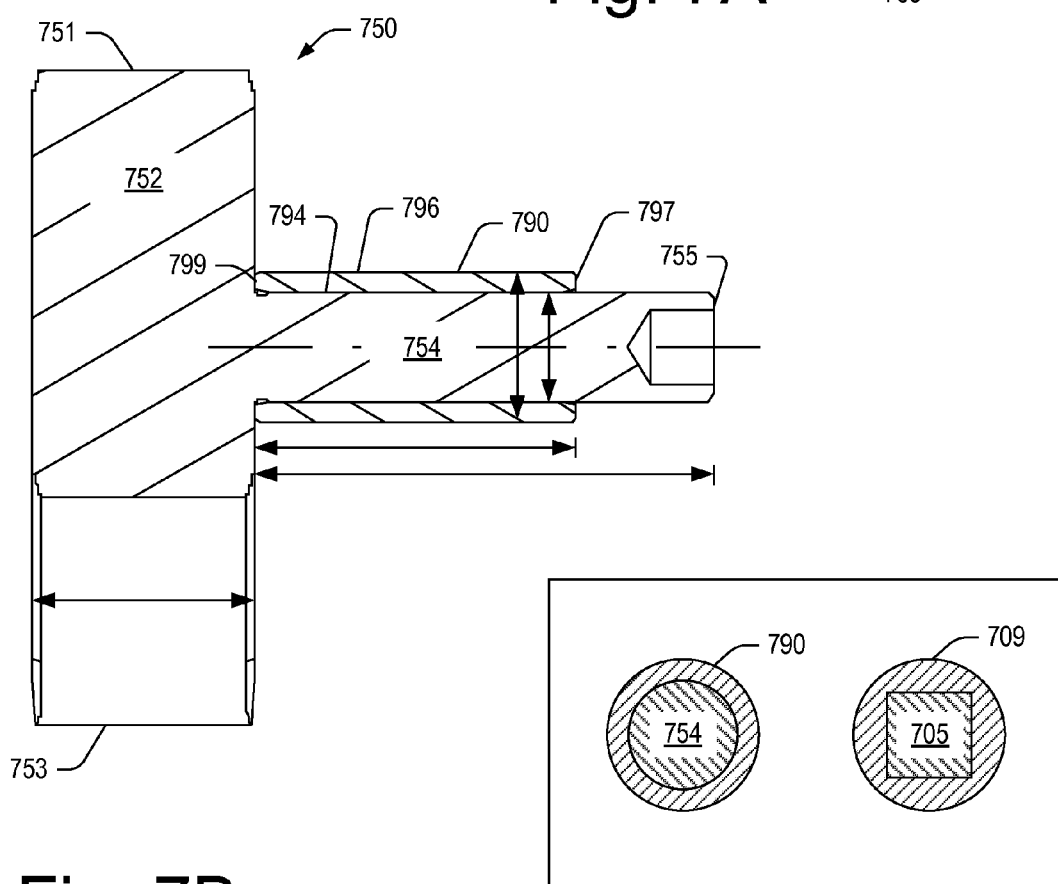
Fig. 7B
Fig. 7C

Method 1600

EXHAUST GAS VARIABLE TURBINE ASSEMBLY

TECHNICAL FIELD

Subject matter disclosed herein relates generally to exhaust turbines for turbochargers for internal combustion engines.

BACKGROUND

An exhaust system of an internal combustion engine can include a turbine wheel set in a turbine housing to create backpressure. In such a system, as pressurized exhaust gas from the internal combustion engine passes through the turbine housing (e.g., en route to an atmospheric outlet), the turbine wheel harnesses energy as the exhaust gas expands.

A turbocharger can include a variable nozzle turbine (VNT), which can include one or more types of mechanisms that can alter geometry of a passage or passages between an exhaust gas volute and a turbine wheel space. As an example, a VNT can control the flow of exhaust gas to a turbine wheel through use of vanes that can be moved to alter geometry of throats through which the exhaust gas can flow to the turbine wheel.

As an example, at low engine speed, vanes may be controlled to move them toward a closed orientation that can direct the flow of exhaust gas through smaller sized throats and, for example, in a particular tangential direction toward an inducer portion of a turbine wheel. Such an approach can increase turbine power and boost pressure at low engine speeds.

As an example, at higher engine speeds, vanes may be controlled to move them toward an open orientation that can direct the flow of gas through larger sized throats, which lessen restriction to flow compared to smaller sized throat associated with a more closed orientation. In a more open orientation of the vanes, exhaust gas flow may be maximized and directed in a particular tangential direction toward an inducer portion of a turbine wheel in a manner that helps to avoid turbo over-speed while maintaining a desired level of boost pressure for an internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 7A, 7B and 7C are series of views of examples of vane assemblies;

DETAILED DESCRIPTION

Figure 1:
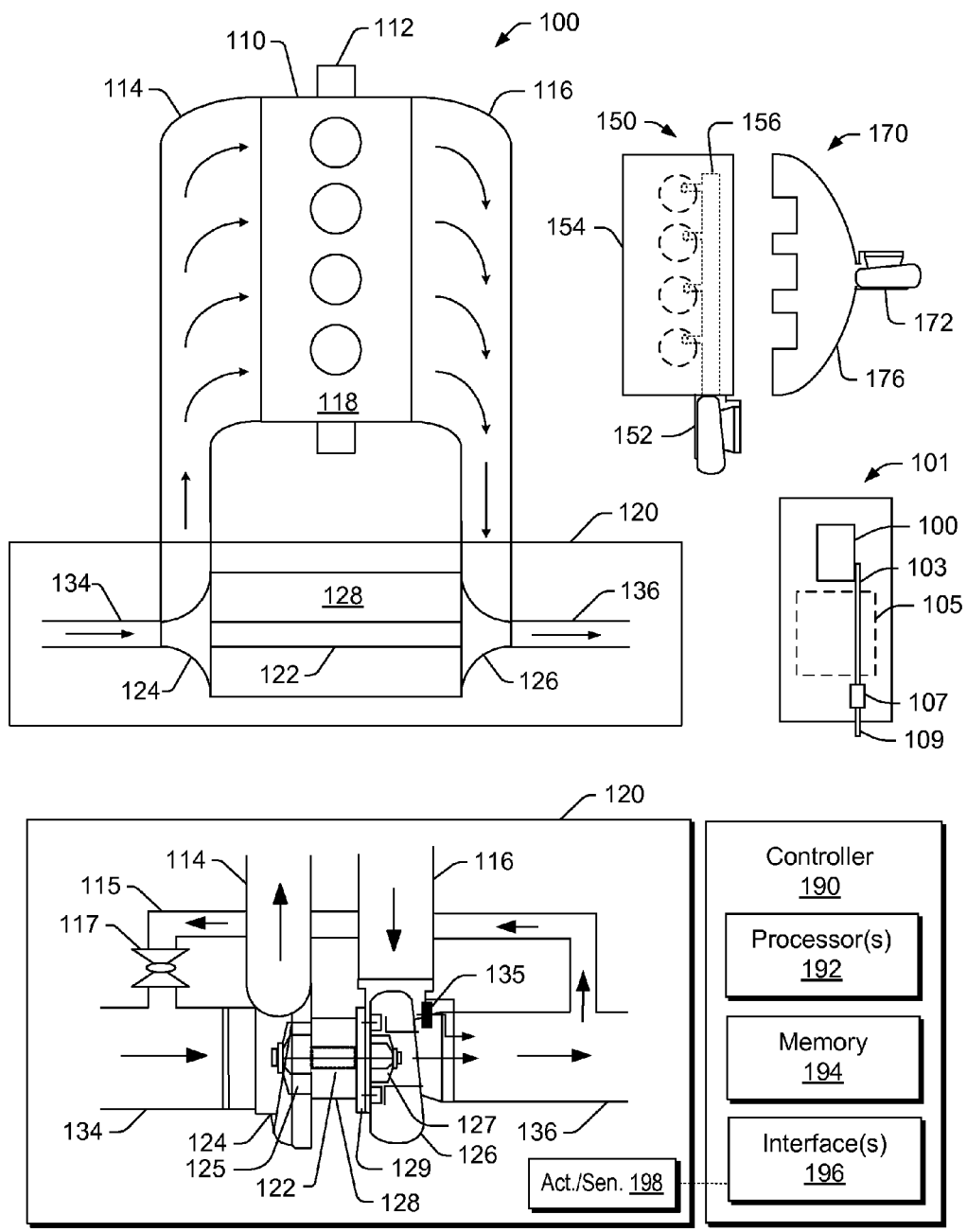
FIG. 1 is a diagram of a turbocharger and an internal combustion engine along with a controller.

As an example, a turbine assembly of an exhaust gas turbocharger can include vanes as part of a variable geometry turbine (VGT) or variable nozzle turbine (VNT). Vanes may be disposed at least in part in a cartridge where the cartridge is disposed between a turbine housing and a center housing of a turbocharger.

As an example, a cartridge may include a shroud component and an annular component spaced axially by mounts (e.g., spacers) where vanes are accommodated to control exhaust flow from a volute to a turbine wheel space. As an example, a vane may include a trailing edge and a leading edge with a pressure side airfoil and a suction side airfoil that meet at the trailing edge and the leading edge. Such a vane may have a planar upper surface and a planar lower surface where a clearance exists between the planar upper surface and the shroud component (e.g., between a lower planar surface of an annular portion of the shroud component) and/or where a clearance exists between the planar lower surface and the annular component (e.g., between an upper planar surface of an annular portion of the annular component).

As an example, each vane may include an axis about which the vane may pivot (e.g., a pivot axis). As an example, each vane may include a post (e.g., or axle) that defines a pivot axis. As an example, a post may be integral with a vane (e.g., cast as a single piece of metal, alloy, etc.) or a post may be a separate component that can be operatively coupled to a vane.

As an example, movement of a vane (e.g., arcwise) may be less closer to the pivot axis and greater further away from the pivot axis. For example, a trailing edge or a leading edge may be disposed a distance from the pivot axis such that upon pivoting of a vane, the leading edge and/or the trailing edge sweeps a maximum arc of the vane for a desired amount of pivoting. If clearance between an upper surface of a vane and a shroud component is diminished, the vane may bind, where the risk may increase depending on arc length as interaction area can increase with respect to arc length. In such an example, deformation to a shroud component may cause a vane or vanes to bind upon pivoting or even in a static position. Binding can result in loss of control, stress to a control mechanism, wear, etc.

As an example, forces acting on a vane and/or a post of a vane may cause a vane or vanes to bind upon pivoting or even in a static position. Binding can result in loss of control, stress to a control mechanism, wear, etc.

As to pressure differentials and temperatures in a variable geometry turbine assembly, as an example, exhaust in a volute may have pressure in a range of approximately 120 kPa to approximately 400 kPa and possible peak pressure of up to approximately 650 kPa (absolute) and, for example, temperature in a range of approximately 150 degrees C. to approximately 980 degrees C.; whereas, at a location axially downstream of a turbine wheel, exhaust may have pressure in a lower range and temperature in a lower range. Exhaust gas temperatures in a gasoline fuel internal combustion engine may exceed those of a diesel fuel internal combustion engine. Where a variable geometry turbine assembly is utilized with a gasoline fuel internal combustion engine, the environment may be harsher in terms of temperature when compared to a diesel fuel internal combustion engine.

As an example, one or more components of a variable geometry turbine assembly (e.g., VGT or VNT) can include at least a portion made of a material that can withstand pressures and temperatures in the aforementioned ranges. For example, a material can be the INCONEL® 718 alloy (Specialty Materials Corporation, New Hartford, N.Y.). The INCONEL® 718 alloy includes nickel (e.g., 50-55% by mass), chromium (e.g., 17-21% by mass), iron, molybdenum, niobium, cobalt, aluminum and other elements. Some other examples of materials include INCONEL® 625, C263 (aluminum-titanium age hardening nickel), René 41 (nickel-based alloy), WASPALOY® alloy (age hardened austenitic nickel-based alloy, United Technologies Corporation, Hartford, Conn.), etc.

As to INCONEL® alloy, consider a nickel content greater than about 44% by mass (e.g., INCONEL® 617 alloy at about 44.2-56% by mass Ni). As to René 41 alloy, consider a nickel content that is greater than about 50% by mass. As to WASPALOY® alloy, consider an alloy that includes nickel at about 58%, chromium at about 19%, cobalt at about 13%, molybdenum at about 4%, titanium at about 3% and aluminum at about 1.4% (percentages by mass). As an example, a material may be of a composition that is predominantly nickel, for example, where the largest single constituent by mass percent is nickel.

As an example, a cartridge can include vanes that are disposed at least in part between two components. As an example, at least a portion of a vane may be made of a material such as HK30, which is a chromium-nickel-iron stainless steel alloy including approximately 30% chromium and 20% nickel, with the balance being predominantly iron (percentages by mass). As an example, at least a portion of a vane may be made of a HK series stainless steel alloy that includes about 18-22% nickel by mass. Such an alloy can be fully austenitic.

As an example, one or more components of a cartridge may be made of a material such as, for example, PL23 alloy or SS310 alloy.

As to PL23 alloy, it can include, in terms of mass percent, C=0.4-0.7%, Cr=18-21%, Ni=12-14%, S=0.2-0.4%, Si=1.8-2.2%, the remainder being iron and nonspecific alloy ingredients and/or impurities up to about 3%. As to SS310 alloy, it can include from about 19-22% nickel by mass and about 24-26% chromium by mass, with the remainder being largely iron. Thus, PL23 alloy and SS310 alloy include predominantly iron, with nickel less than about 22% by mass.

As an example, an exhaust gas variable geometry turbine assembly can include a number of pivotable vanes that define throats within an exhaust gas nozzle where each of the pivotable vanes includes a corresponding post, where each of the pivotable vanes is made of a first alloy that includes a first amount of nickel by mass, where each of the corresponding posts is made of a second alloy that includes a second amount of nickel by mass and where the second amount of nickel by mass exceeds the first amount of nickel by mass.

As an example, an exhaust gas variable geometry turbine assembly can include a number of pivotable vanes that define throats within an exhaust gas nozzle where each of the pivotable vanes includes a corresponding post that is received at least in part by a corresponding one of a plurality of bores of an annular component; and a number of bushings where each of the bushings is operatively coupled to a corresponding one of the pivotable vanes where each of the pivotable vanes includes a first alloy that includes a first amount of nickel by mass, where each of the corresponding bushings includes a second alloy that includes a second amount of nickel by mass and where the second amount of nickel by mass exceeds the first amount of nickel by mass.

Below, an example of a turbocharged engine system is described followed by various examples of components, assemblies, methods, etc.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
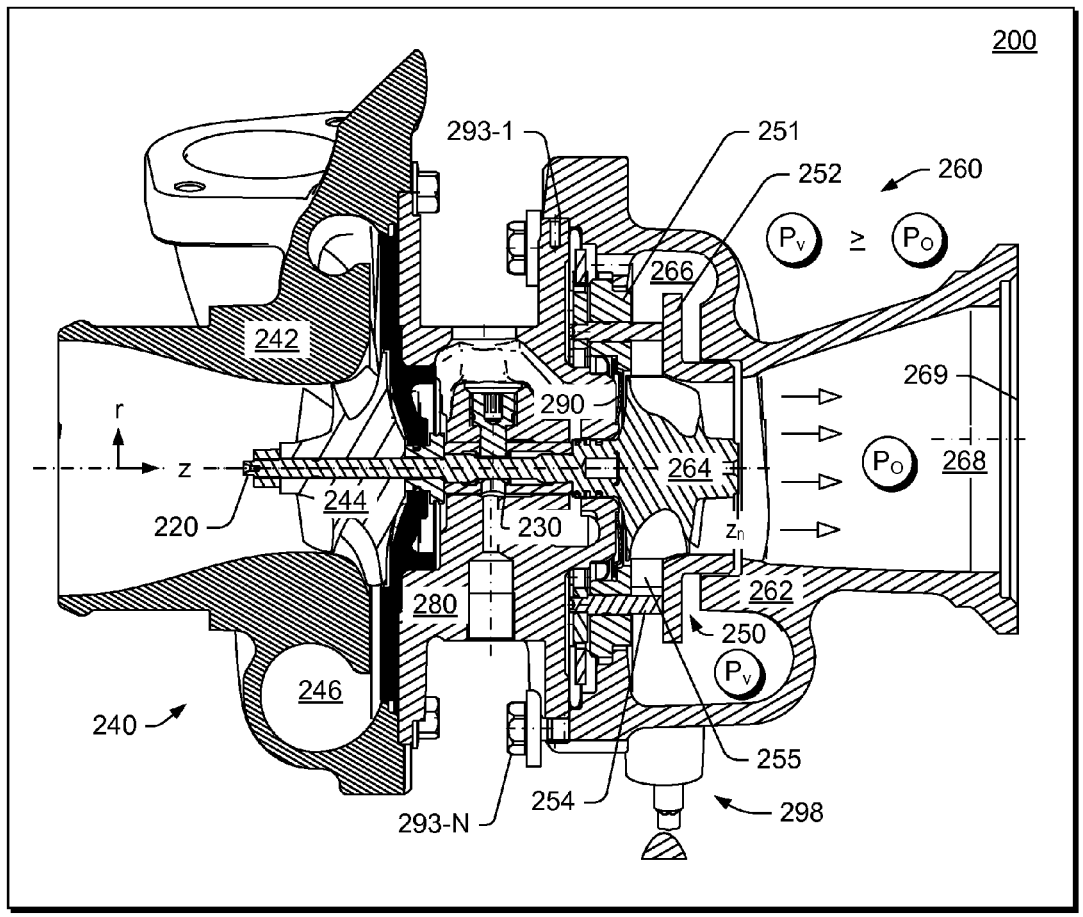
FIG. 2 is a cutaway view of an example of a turbocharger assembly.

FIG. 2 shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 and a turbine assembly 260. The compressor assembly 240 includes a compressor housing 242 that defines a volute 246 and that houses a compressor wheel 244. As shown in FIG. 2, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

The turbine assembly 260 further includes a variable geometry assembly 250, which may be referred to as a "cartridge" (e.g., the cartridge 250), that may be positioned using an annular component or flange 251 (e.g., optionally shaped as a stepped annular disc) of the cartridge 250 that clamps between the housing 280 and the turbine housing 262, for example, using bolts 293-1 to 293-N and a heat shield 290 (e.g., optionally shaped as a stepped annular disc, the latter of which is disposed between the cartridge 250 and the housing 280. As shown in the example of FIG. 2, the cartridge 250 includes a shroud component 252 and the annular component 251. As an example, one or more mounts or spacers 254 may be disposed between the shroud component 252 and the annular component 251, for example, to axially space the shroud component 252 and the annular component 251 (e.g., forming a nozzle space).

As an example, vanes 255 may be positioned between the shroud component 252 and the annular component 251, for example, where a control mechanism may cause pivoting of the vanes 255. As an example, the vane 255 may include a vane post that extends axially to operatively couple to a control mechanism, for example, for pivoting of the vane 255 about a pivot axis defined by the vane post.

As an example, each vane may include a vane post operatively coupled to a control mechanism. In the example of FIG. 2, a clearance exists between an upper surface of the vane 255 and a lower surface of the shroud component 252. As mentioned, deformation of the shroud component 252 may diminish such clearance and, for example, have an effect on vane control. In the example of FIG. 2, a clearance can exist between a lower surface of the vane 255 and an upper surface of the annular component 251. As an example, deformation of the shroud component 252 may also diminish such clearance and, for example, have an effect on vane control. For example, to move vanes, a greater force may be required from a controller. In such an example, a controller may be sized to overcome such force, which, in turn, may increase cost, increase energy consumption, decrease available compartment space, etc.

As an example, a surface of a vane post may define a clearance with respect to a surface of a vane post bore of the annular component 251. In such an example, one or more forces may act to diminish the clearance such that contact occurs between the surfaces, which may increase demand on a controller. In such an example, a controller may be sized to overcome such force, which, in turn, may increase cost, increase energy consumption, decrease available compartment space, etc.

As to exhaust flow, higher pressure exhaust in the volute 266 passes through passages (e.g., a nozzle or nozzles, a throat or throats, etc.) of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_v$) is greater than the exhaust pressure in the passage 268 ($P_o$).

As shown in FIG. 2, the turbine wheel 264 can include an inducer portion and an exducer portion, for example, characterized in part by an inducer radius ($r_i$) and an exducer radius ($r_e$). As an example, an individual blade can include an inducer edge (e.g., a leading edge) and an exducer edge (e.g., a trailing edge) where an inducer edge may be oriented in a substantially axial direction and where an exducer edge may be oriented in a substantially radial direction. An inducer diameter, as may be defined by inducer edges, can exceed an exducer diameter, as may be defined by exducer edges. A turbine wheel may be defined in part by a trim value that characterizes a relationship between inducer and exducer portions.

Figure 3A:
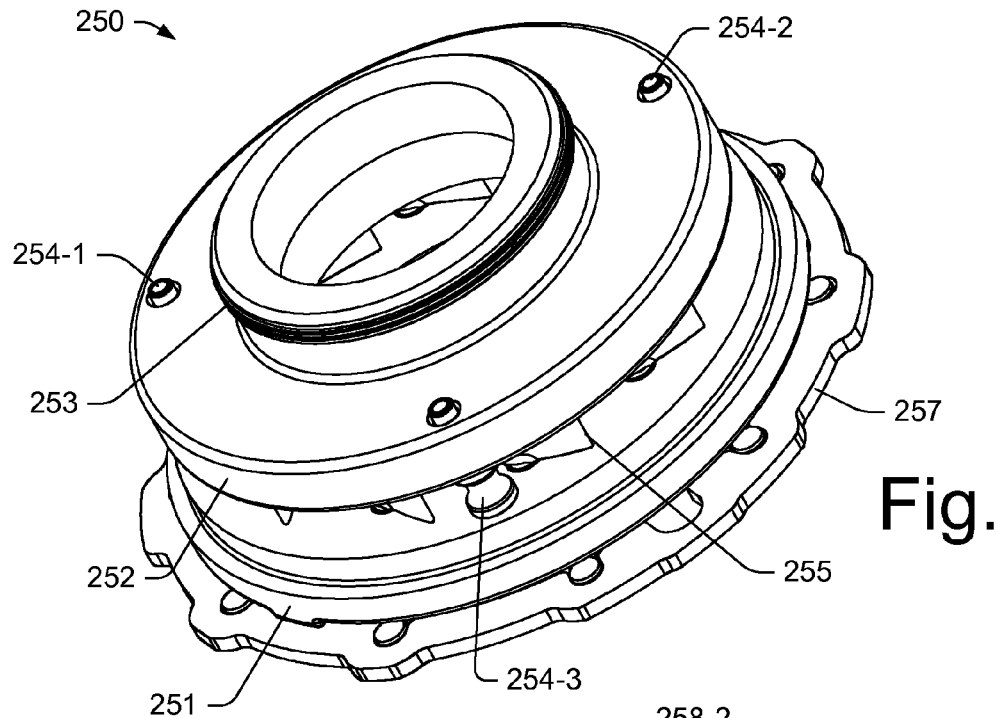
FIGS. 3A and 3B are a series of views of an example of a cartridge.
Figure 3B:
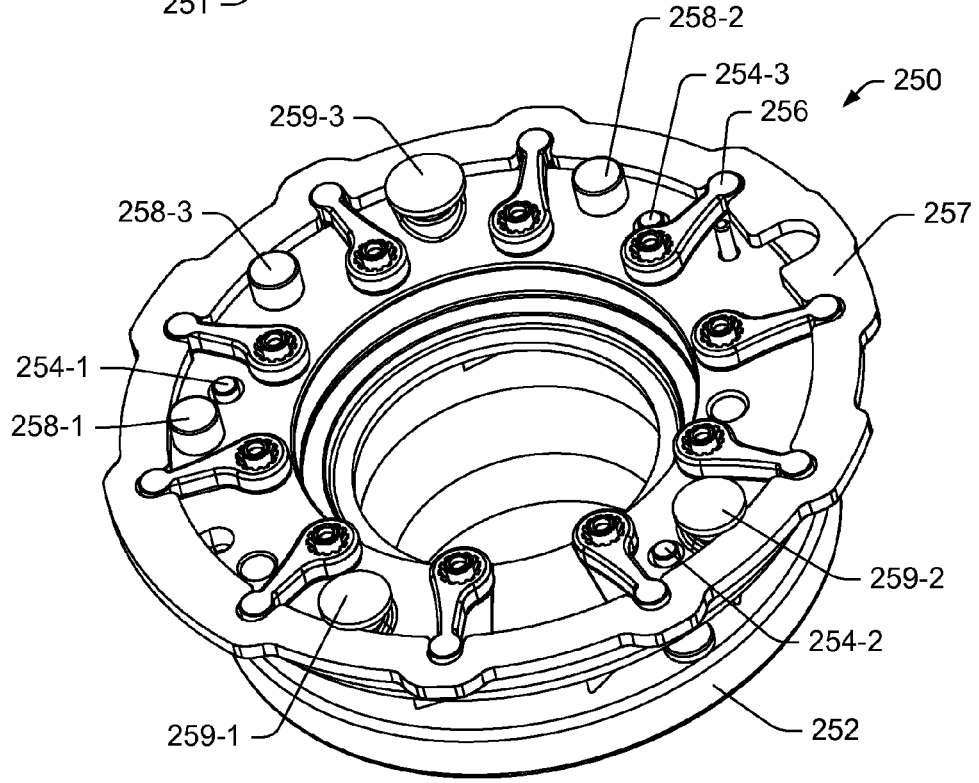

FIGS. 3A and 3B show perspective views of the example cartridge 250 of FIG. 2. These perspective views show one or more seal rings 253 seated in a groove or grooves of the shroud portion 252, a plurality of spacers 254-1, 254-2 and 254-3, a plurality of vanes 255, a plurality of vane control arms 256, a unison ring 257, a plurality of pins 258-1, 258-2 and 258-3, and a plurality of guides 259-1, 259-2 and 259-3. In the example of FIGS. 3A and 3B, the unison ring 257 may be rotated about a central axis (e.g., substantially aligned with the axis of rotation of a turbine wheel) to cause the plurality of vane control arms 256 to rotate about respective post axes of individual vane posts of the plurality of vanes 255. The plurality of pins 258-1, 258-2 and 258-3 and the plurality of guides 259-1, 259-2 and 259-3 may help to align the unison ring 257 with respect to other components of the cartridge 250.

Figure 4:
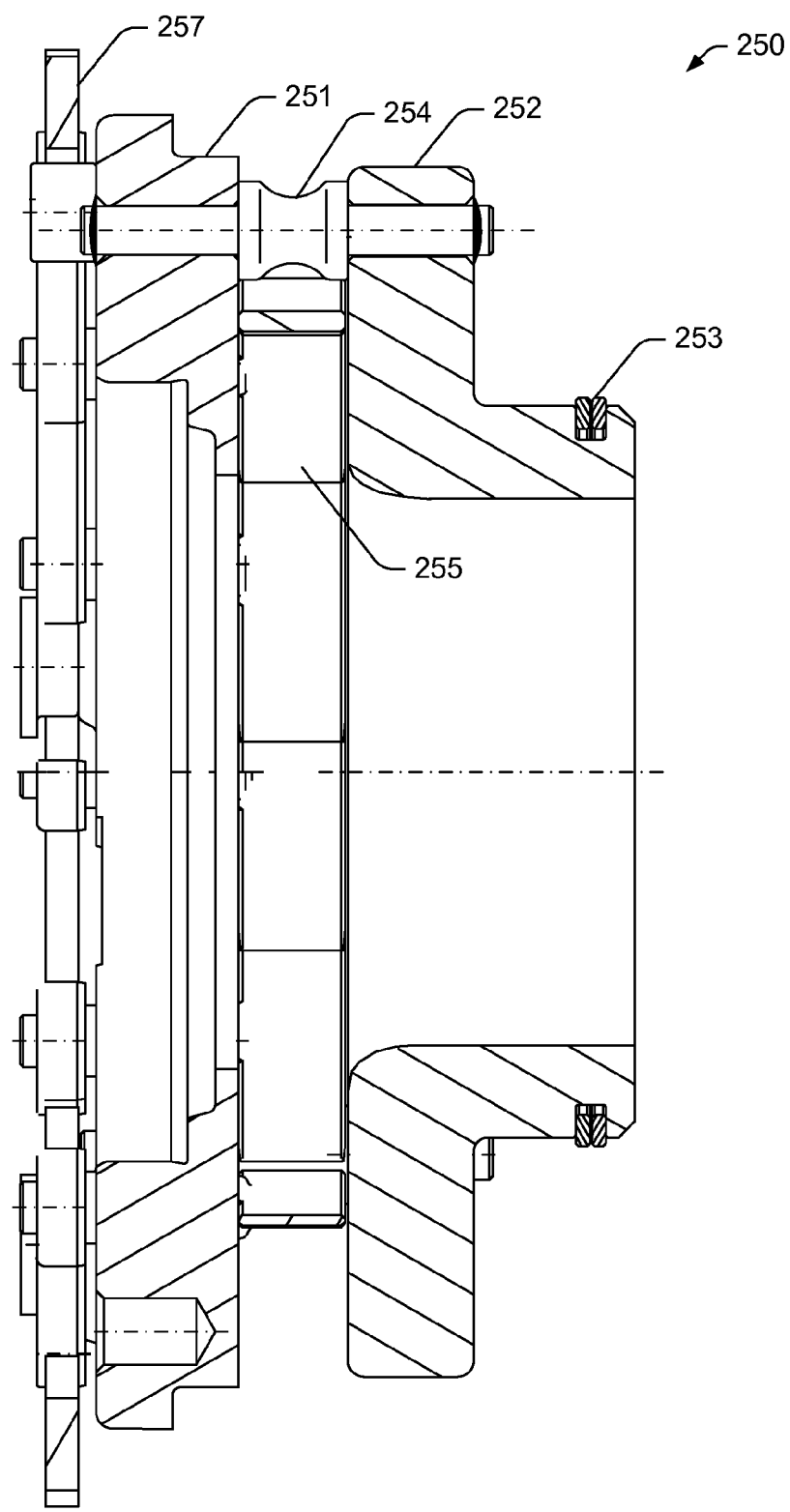
FIG. 4 is a cutaway view of the cartridge of FIGS. 3A and 3B.

FIG. 4 shows a cutaway view of the cartridge 250 of FIGS. 3A and 3B. As shown, the vane 255 is disposed at least in part between the annular component 251 and the shroud component 252 where an axial distance between the components 251 and 252 may be defined at least in part by the spacer 254.

Figure 5:
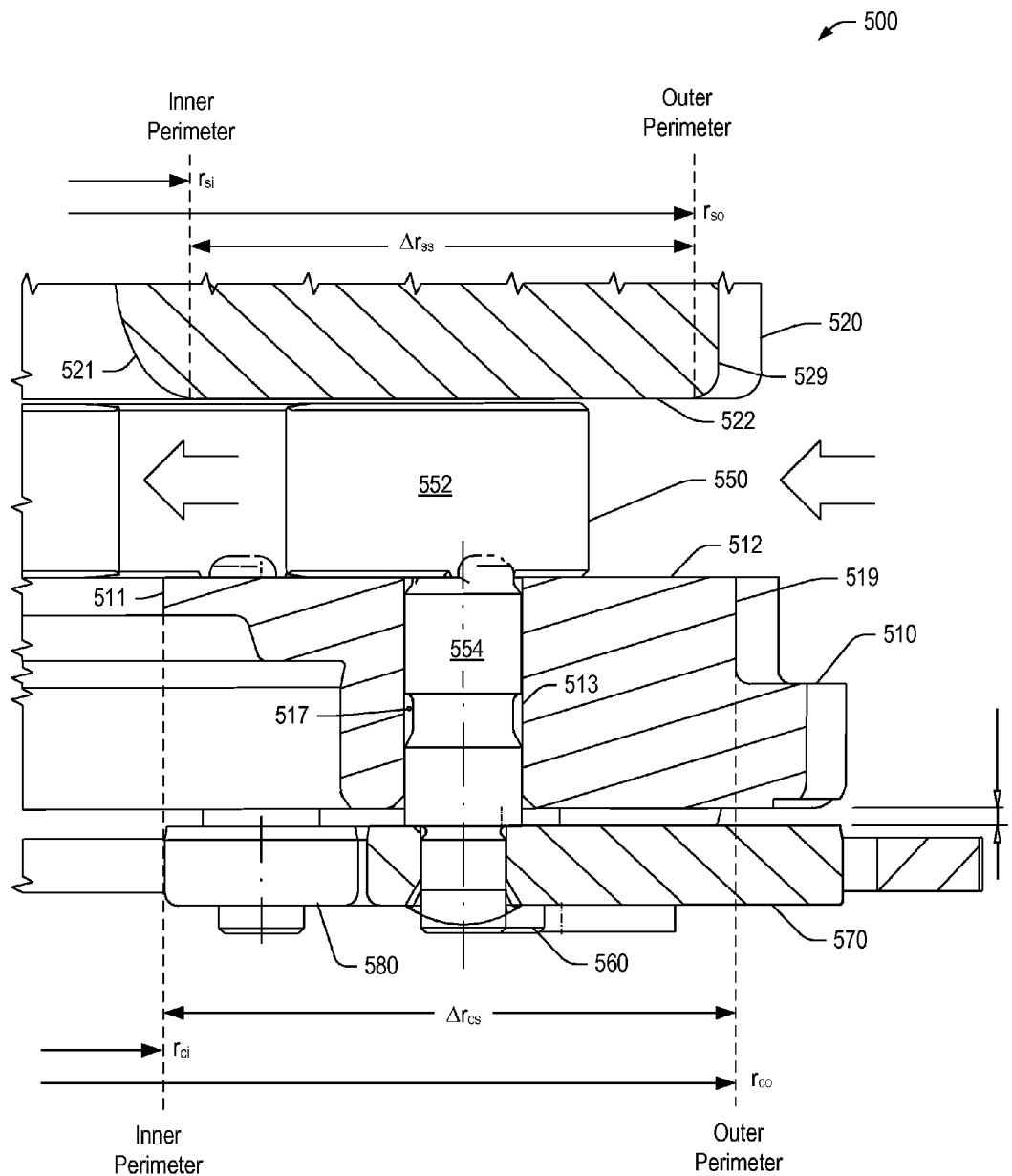
FIG. 5 is a cutaway view of a portion of an example of a cartridge.

FIG. 5 shows a portion of an example of a cartridge 500, which may be a cartridge such as, for example, the cartridge 250. As shown in FIG. 5, the cartridge 500 includes an annular component 510 with a surface 511 (e.g., at an inner perimeter, see radius $r_{ci}$) that defines a central opening for receipt of at least a portion of a turbine wheel, an annular surface 512 that extends from the surface 511 to a surface 519 (e.g., at an outer perimeter, see radius $r_{ci}$) where the annular surface 512 can be characterized at least in part by a dimension $\Delta r_{cs}$, and a vane post bore surface 513 that defines a vane post bore 517 that extends from the annular surface 512 axially downwardly through the annular component 510.

As shown in FIG. 5, the cartridge 500 includes a shroud component 520 that includes a shroud surface 521 and an annular surface 522 that extends radially outwardly away from the shroud surface 521 toward an outer surface 529 and that, in combination with the annular surface 512 of the annular component, defines an annular nozzle space in which at least a portion 552 of a vane 550 is disposed. As an example, the portion 552 may be referred to as an airfoil portion of the vane 550 (e.g., noting that it is intended to operate in an exhaust gas environment).

In the example of FIG. 5, the annular surface 512 of the shroud component 520 can be or include a substantially planar annular surface. For example, a substantially planar annular surface may be defined at least in part by an inner perimeter (see, e.g., radius $r_{si}$) and may be defined at least in part by an outer perimeter (see, e.g., radius $r_{so}$). Such a substantially planar annular surface may be characterized by a dimension $\Delta r_{ss}$. As to the inner perimeter, this may be defined at a point (e.g., a circle) where the shroud surface 521 transitions to horizontal in the view of FIG. 5. For example, such a point may be defined at a radius measured from a central axis (e.g., substantially aligned with a rotational axis of a turbine wheel) where the surface 522 and the surface 512 are substantially parallel. As shown in the example of FIG. 5, over a common radial span, the surface 512 and the surface 522 are substantially parallel and substantially planar.

As shown, the vane 550 includes a vane post 554 that is disposed at least in part in the bore 517 of the annular component 510 as defined by the vane post bore surface 513. As shown, a vane control arm 560 is operatively coupled to the vane post 554 and operatively coupled to a unison ring 570 that can be guided by a pin 580, which may be a rotating pin (e.g., a wheel portion rotatable about an axle).

As mentioned, where deformation exists as to the shroud component 520, forces may act upon the vane 550. As an example, where deformation exists as to the annular component 510, forces may act upon the vane 550. As an example, forces may act on the vane post 554 and/or the vane post bore surface 513 of the annular component 510. As an example, where deformation exists as to a vane (e.g., an airfoil portion and/or a post portion, etc.), forces may act on one or more components (e.g., the shroud component 520, the annular component 510, etc.).

As shown in the example of FIG. 5, the vane 550 includes at least a portion (e.g., an airfoil portion) that is disposed between the surface 512 and the surface 522. In such an example, a clearance may exist in that a height of the at least a portion of the vane 550 is less than an axial dimension between the surface 512 and the surface 522 where the axial dimension is at a radius from a central axis where the surface 512 and the surface 522 are substantially parallel to each other. As an example, a clearance may be relatively small and, depending on one or more factors, some amount of contact may occur between an upper surface of the vane 550 and the surface 522 and/or between a lower surface of the vane 550 and the surface 512.

As an example, such aforementioned contact involving the surface 512 and/or the surface 522 may possibly result from contacting with respect to a post in a bore. For example, consider the vane post 554 contacting the vane post bore surface 513 in a manner that can impart a translational force as to the vane 550 (e.g., upwards or downward with respect to a pivot axis of the vane post 554). In such an example, where contacting as to a vane post is reduced (e.g., amount of friction reduced, wear reduced, etc.), contacting as to one or more other components may be reduced as well. Such an approach may benefit control as an actuator may more readily achieve a desired amount of control without having to overcome excessive frictional force(s). As an example, an actuator may be rated based at least in part on expected frictional force that may occur within a variable geometry assembly over an operational lifetime of the assembly.

In the example of FIG. 5, clearance can exist between the vane post bore surface 513 and a portion of the vane 550 (e.g., a surface of the vane post 554) that is disposed at least in part in the bore 517 formed by the vane post bore surface 513. As an example, a clearance may be relatively small and, depending on one or more factors, some amount of contact may occur between the vane post 554 and the vane post bore surface 513. As an example, an assembly may be made of materials where amount of contacting (e.g., detrimental contacting), amount of friction reduced, wear, etc., are reduced, for example, particularly at relatively high temperature (e.g., consider a temperature above about 900 degrees C.). In such an example, contacting as to one or more other components may be reduced as well.

Contact between components can result in wear of one or more of the components. Contact may result in friction that may or may not be overcome at least in part by force applied by an actuator (e.g., to the vane control arm 560). Where an actuator cannot apply sufficient force to overcome friction, vanes may be considered to be stuck. In such an example, sticking may be due at least in part to temperature of exhaust gas flowing to and through throats formed by and between adjacent vanes. For example, temperature may be relatively high (e.g., in a gasoline internal combustion engine, possibly above 900 degrees C.) such that one or more materials of construction may be effected and cause an increase in friction that may lead to sticking.

As shown in various figures, an assembly may include a plurality of vanes and associated control components. For example, an assembly may include from about four vanes to about thirty vanes. In the example of FIGS. 3A and 3B, ten vanes are included in the assembly 250. Thus, opportunities exist as to sticking for each vane and forces may sum as to contacting of more than one vane (e.g., an airfoil portion and/or a post portion) to one or more other components. As an example, one or more materials may be hysteretic. As an example, forces may depend on amount of pivot of vanes and/or one whether pivoting is toward opening or toward closing (e.g., force hysteresis).

As an example, an exhaust gas variable geometry turbine assembly such as, for example, the assembly 500 of FIG. 5, can include a shroud component that includes an inner perimeter, an outer perimeter and a shroud component surface that extends from the inner perimeter to the outer perimeter; an annular component that includes an inner perimeter, an outer perimeter, an annular component surface that extends from the inner perimeter to the outer perimeter, a number of bore openings disposed in the annular component surface and a corresponding number of bores; at least one spacer that defines a nozzle height of an exhaust gas nozzle defined by a planar portion of the shroud component surface and a planar portion of the annular component surface; and, for example, a number of pivotable vanes that define throats within the exhaust gas nozzle where each of the pivotable vanes includes a corresponding post that is received at least in part by a corresponding one of the bores of the annular component, where each of the pivotable vanes includes a first alloy that has a first amount of nickel by mass, where each of the corresponding posts includes a second alloy that has a second amount of nickel by mass and where the second amount of nickel by mass exceeds the first amount of nickel by mass.

As an example, a vane can include a post where the vane is made of two different materials. As an example, a vane can include an airfoil portion that is made of a first material and a post portion that is made of a second material where the nickel content differs between the two materials, which may include a scenario where one of the materials is essential free of nickel (e.g., nickel at trace levels or below about 0.1 percent by mass). As an example, a vane may be operatively coupled to a post where the vane and the post are made of different materials.

As an example, an exhaust gas variable geometry turbine assembly can include a shroud component that includes an inner perimeter, an outer perimeter and a shroud component surface that extends from the inner perimeter to the outer perimeter; an annular component that includes an inner perimeter, an outer perimeter, an annular component surface that extends from the inner perimeter to the outer perimeter, a number of bore openings disposed in the annular component surface and a corresponding number of bores; at least one spacer that defines a nozzle height of an exhaust gas nozzle defined by a planar portion of the shroud component surface and a planar portion of the annular component surface; a number of pivotable vanes that define throats within the exhaust gas nozzle where each of the pivotable vanes includes a corresponding post that is received at least in part by a corresponding one of the bores of the annular component; and, for example, a number of bushings where each of the bushings is operatively coupled to a corresponding one of the pivotable vanes or operatively coupled to the annular component where each of the pivotable vanes includes a first alloy that has a first amount of nickel by mass, where each of the corresponding bushings includes a second alloy that has a second amount of nickel by mass and where the second amount of nickel by mass exceeds the first amount of nickel by mass. For example, the vanes may be made of a first material and the bushings may be made of a second material where the first material and the second material differ. As an example, the nickel content can differ between the two materials, which may include a scenario where one of the materials is essential free of nickel (e.g., nickel at trace levels or below about 0.1 percent by mass). As an example, a vane may be operatively coupled to a post where the vane and the post are made of the same material or made of different materials.

As shown in the example of FIG. 5, the vane 550 includes a vane post 554 that extends axially downward. In the example of FIG. 5, the vane 550 does not include a through post or other type of post that extends axially upward. As an example, where a vane with a post operatively coupled to the vane or integral to the vane has a mass, the mass of the vane may be reduced where the post extends from a single side of the vane. For example, as shown in the example of FIG. 5, the vane post 554 extends from a lower side of an airfoil portion of the vane 550. In other words, the vane post 554 (or another vane post) does not extend from an upper side of the airfoil portion of the vane 550. While a two post or a through post that extends past an upper side and a lower side of a vane may provide benefits as to alignment, stability, etc., in comparison to a vane such as, for example, the vane 550, such approaches introduce additional mass. As an example, material or materials can have associated costs and, as such, additional mass can introduce additional cost. Further, where a two post or a through post that extends past an upper side and a lower side of a vane is utilized in an assembled cartridge, a shroud component must include openings to accommodate the post or post portion that extends upwards and away from an upper surface of a vane, which may add to cost, stress within a shroud component, etc.

As an example, a vane can include a flat planar upper surface and a flat planar lower surface that define a height of an airfoil portion of the vane. In such an example, the vane can include a unidirectional post, which may be integral or operatively coupled to the vane. In such an example, an overall height of the vane may be measured from a bottom end of the unidirectional post to the flat planar upper surface.

Figure 6A:
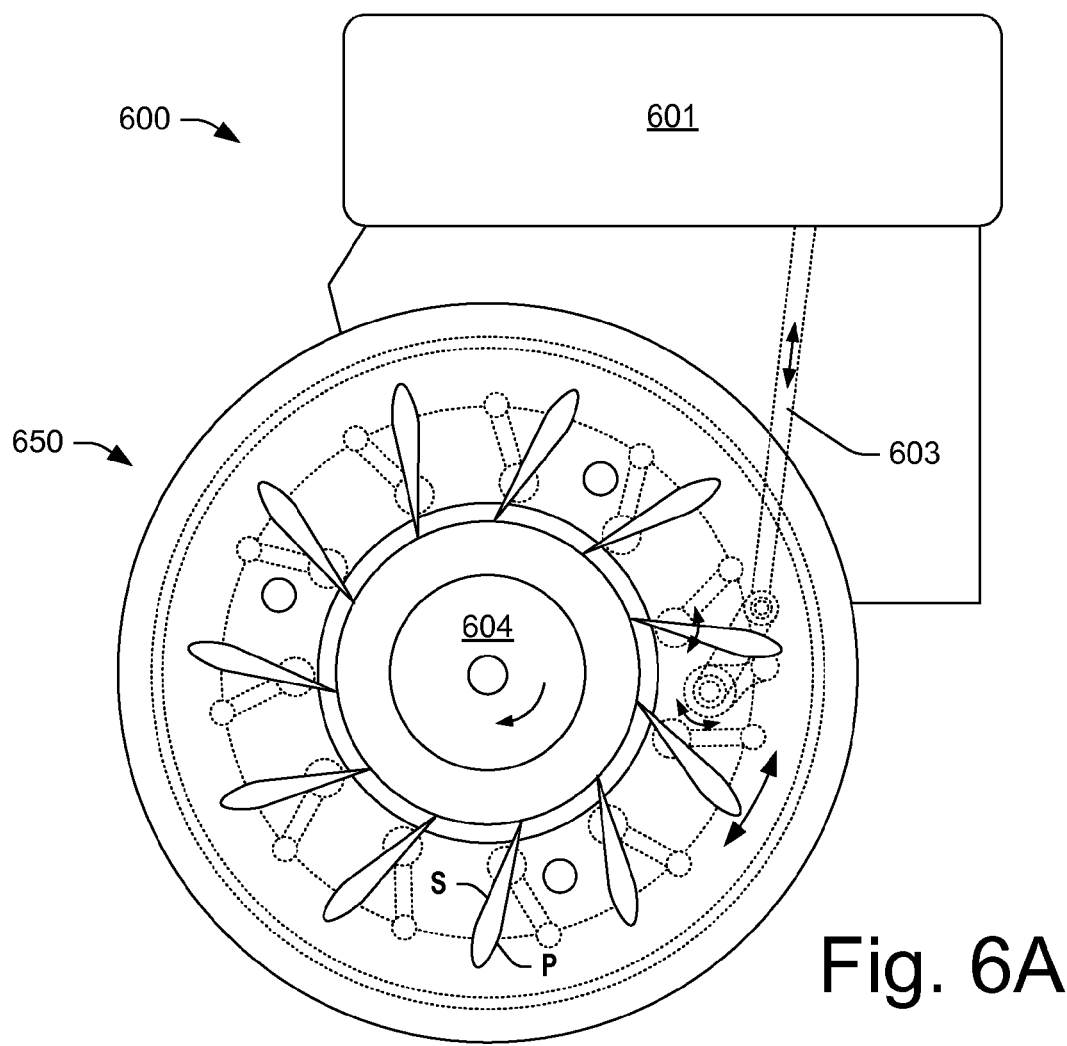
FIGS. 6A and 6B are views of a portion of an example of a turbocharger assembly and a portion of an example of a turbine assembly.
Figure 6B:
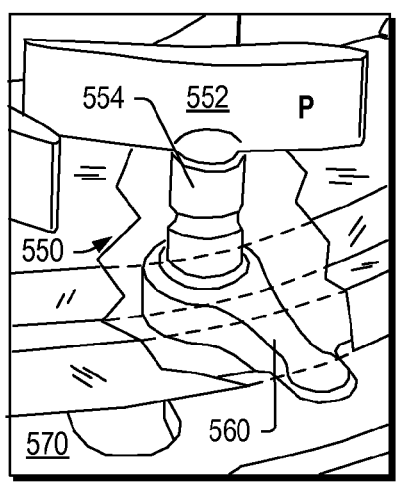

FIGS. 6A and 6B show an approximate view of an assembly 600 and an approximate partially cutaway view of a portion of an assembly. As shown, a controller 601 can move a control rod 603 to cause vanes of a cartridge 650 to move. Such movement may alter the angle of the vanes with respect to a turbine wheel 604. FIG. 6B shows an approximate view of the vane 550 that includes the airfoil portion 552 and the vane post 554 where the vane control arm 560 may be rotated via actuation of a unison ring via a controller such as the controller 601. For example, the control rod 603 can be operatively coupled to the unison ring 570 where rotation of the unison ring 570 causes the vane control arm 560.

In FIGS. 6A and 6B, labels are also included for pressure side (P) and suction side (S) of vanes. A pressure side (P) is a more generally radially outwardly facing surface while a suction side (S) is a more generally radially inwardly facing surface. As exhaust gas flow from a volute to the vanes, it encounters the pressure sides of the vanes which direct flow of the exhaust gas through throats where an individual throat is defined by a pressure side of one vane and a suction side of another vane. As the throats represent restricted cross-sectional areas for flow of exhaust gas, the velocity of the exhaust gas can increase as it passes through an individual throat.

For a vane of a variable geometry assembly (e.g., a cartridge), a suction surface (e.g., inwardly facing toward a turbine wheel) is generally associated with higher velocity and lower static pressure and a pressure surface (e.g., outwardly facing away from a turbine wheel) has a comparatively higher static pressure than the suction surface. As an example, a vane may be defined with respect to a chord line, which is a straight line connecting the leading and trailing edges. The chord length, or simply chord, c, is the length of the chord line.

As mentioned, one or more components of a variable geometry turbine assembly (e.g., VGT or VNT) can include at least a portion made of a material that can withstand pressures and temperatures in the aforementioned ranges, particularly as to exhaust gas of gasoline internal combustion engines. For example, a material can be the INCONEL® 718 alloy (Specialty Materials Corporation, New Hartford, N.Y.). The INCONEL® 718 alloy includes nickel (e.g., 50-55% by mass), chromium (e.g., 17-21% by mass), iron, molybdenum, niobium, cobalt, aluminum and other elements. Some other examples of materials include INCONEL® 625, C263 (aluminum-titanium age hardening nickel), René 41 (nickel-based alloy), WASPALOY® alloy (age hardened austenitic nickel-based alloy, United Technologies Corporation, Hartford, Conn.), etc.

As to INCONEL® alloy, consider a nickel content greater than about 44% by mass (e.g., INCONEL® 617 alloy at about 44.2-56% by mass Ni and various other INCONEL® alloys that include at least about 44% by mass). As to René 41 alloy, consider a nickel content that is greater than about 50% by mass. As to WASPALOY® alloy, consider an alloy that includes nickel at about 58%, chromium at about 19%, cobalt at about 13%, molybdenum at about 4%, titanium at about 3% and aluminum at about 1.4% (percentages by mass). As an example, a material may be of a composition that is predominantly nickel, for example, where the largest single constituent by mass percent is nickel.

As an example, a cartridge can include vanes that are disposed at least in part between two components. As an example, at least a portion of a vane may be made of a material such as HK30, which is a chromium-nickel-iron stainless steel alloy including approximately 30% chromium and 20% nickel, with the balance being predominantly iron (percentages by mass). As an example, at least a portion of a vane may be made of a HK series stainless steel alloy that includes about 18-22% nickel by mass. Such an alloy can be fully austenitic.

As an example, one or more components of a cartridge may be made of a material such as, for example, PL23 alloy or SS310 alloy.

As to PL23 alloy, it can include, in terms of mass percent, C=0.4-0.7%, Cr=18-21%, Ni=12-14%, S=0.2-0.4%, Si=1.8-2.2%, the remainder being iron and nonspecific alloy ingredients and/or impurities up to about 3%. As to SS310 alloy, it can include from about 19-22% nickel by mass and about 24-26% chromium by mass, with the remainder being largely iron. Thus, PL23 alloy and SS310 alloy include predominantly iron, with nickel less than about 22% by mass.

In FIGS. 7A, 7B, 7C, 8A, 8B, 9A, 9B, 10A, 10B, 11A, 11B, 12A, 12B, 13A, 13B, 14A, 14B and 16 various examples of components are shown where at least a portion of one or more of the components may be made from an alloy that includes nickel such as, for example, an INCONEL material, a René material, WASPALOY® material, etc. As an example, a vane or vane assembly may be suitable for use with a turbine assembly operatively coupled to a gasoline fuel internal combustion engine where the turbine assembly can experience exhaust gas temperatures that may, for example, exceed about 900 degrees C. (e.g., up to about 980 degrees C. or more).

FIGS. 7A and 7B show an example of a vane assembly 700 that includes a vane 750 that includes a leading edge 751, a trailing edge 753, a suction side surface 756 and a pressure side surface 758 that meet at the leading edge 751 and the trailing edge 753. The vane 750 includes a planar lower surface 757 and a planar upper surface 759. The vane 750 can be defined by one or more parameters such as vane height (e.g., along the z-axis), vane length (e.g., chord length, etc.) and vane thickness. As an example, the vane 750 may be stacked, partially stacked or not stacked with respect to a series of cross-sectional profiles along the z-axis.

As shown in FIGS. 7A and 7B, the vane 750 includes a vane portion 752 and a post portion 754. The vane assembly 700 includes a bushing 790 that includes an inner radius that is greater than an outer radius of the post portion 754 and that includes an outer radius that defines a radial bushing wall thickness with respect to the inner radius. As shown in FIGS. 7A and 7B, the axial length of the bushing 790 can be less than the axial length of the post portion 754. As shown in FIGS. 7A and 7B, the post portion 754 includes an end 755, which may include one or more features for coupling to a vane control arm, for facilitating assembly, etc.

In FIGS. 7A and 7B, the bushing 790 includes a vane an inner surface 794, an outer surface 796 and opposing ends 797 and 799. As shown in FIG. 7C, the bushing 790 can include a circular cross-sectional shape with respect to its inner surface 794 and its outer surface 796. As an example, an inner surface of a bushing may be keyed, for example, a bushing can include a keyway. For example, FIG. 7C also shows an example of an assembly with a post 705 that is shaped to form a key and with a bushing 709 that is shaped to form a keyway. In such an example, the bushing 709 can rotate with the post 705 and vice versa. As an example, a bushing can include a feature that can be operatively coupled to a vane control arm where rotation of the bushing applies torque to a post of a vane to pivot the vane. For example, a key/keyway coupling can be utilized for transfer of torque. In such an example, the post may be made of a material and the bushing may be made of a material where the material of the post has a lesser nickel content than the material of the bushing. In such an example, the outer surface of the bushing may be in contact with a bore surface of an annular component where the outer surface of the bushing, being made of a higher nickel content material, is less susceptible to sticking, binding, wear, etc., when compared to a bushing made of a lesser nickel content material (e.g., HK30, etc.).

In the example of FIGS. 7A and 7B, the two parts 750 and 790 may be interference fit (e.g., press-fit, etc.) or may be fit with a small clearance that can be filled, for example, during arm riveting on a vane axle.

As an example, the bushing 790 can be made of an alloy that includes nickel as a predominant individual constituent such as, for example, an INCONEL material, a René material, WASPALOY® material, etc. As an example, the vane may be made of a different material.

As an example, an assembly can include a vane that includes a post and a bushing that can be disposed at least in part about the post (e.g., substantially concentrically). In such an example, the bushing may be operatively coupled to the post, for example, via an interference fit, welding, etc. As an example, a bushing may be disposed at least in part about a post with a clearance between an inner surface of the bushing and an outer surface of the post. For example, a "loose" fit may be achieved where an inner diameter of a bushing is greater than an outer diameter of a post. As an example, two separate components (e.g., a post and a bushing) may be brought together and joined by interference fit (e.g., press fit, etc.), interference fit and riveting, interference fit and welding, loose fit and riveting, loose fit and welding, etc.

Figure 8A:
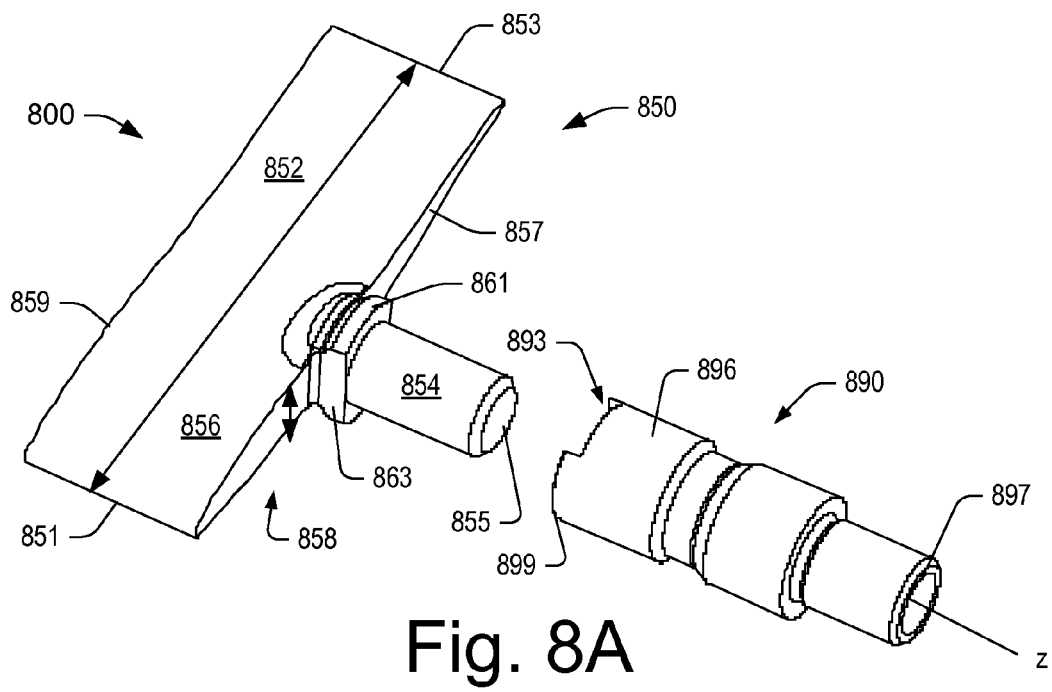
FIGS. 8A and 8B are series of views of an example of a vane assembly.
Figure 8B:
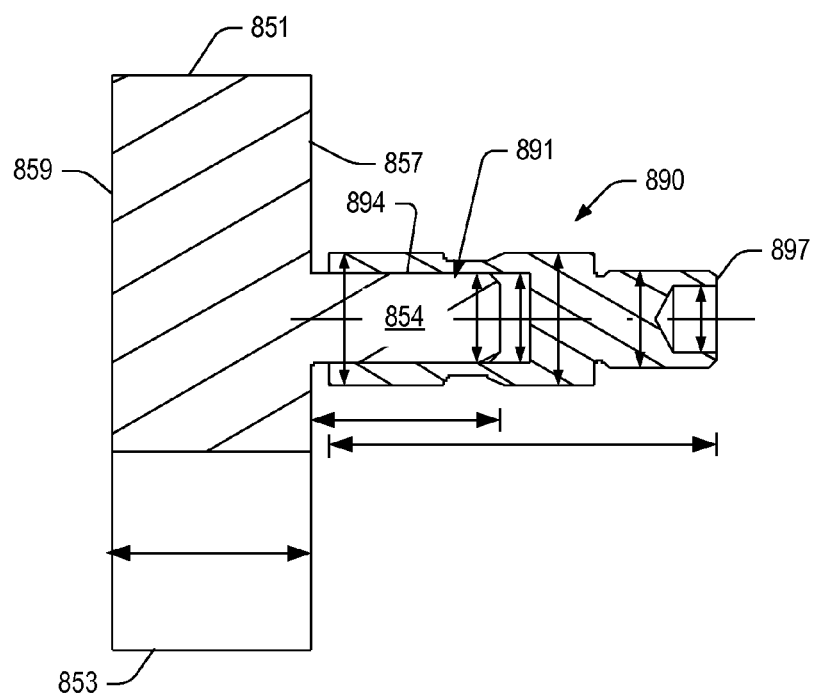

FIGS. 8A and 8B show an example of a vane assembly 800 that includes a vane 850 that includes a leading edge 851, a trailing edge 853, a suction side surface 856 and a pressure side surface 858 that meet at the leading edge 851 and the trailing edge 853. The vane 850 includes a planar lower surface 857 and a planar upper surface 859. The vane 850 can be defined by one or more parameters such as vane height (e.g., along the z-axis), vane length (e.g., chord length, etc.) and vane thickness. As an example, the vane 850 may be stacked, partially stacked or not stacked with respect to a series of cross-sectional profiles along the z-axis.

As shown in FIGS. 8A and 8B, the vane 850 includes a vane portion 852 and a post portion 854. The vane assembly 800 includes a bushing 890 that includes an inner radius that is greater than an outer radius of the post portion 854 and that includes an outer radius that defines a radial bushing wall thickness with respect to the inner radius. As shown in FIGS. 8A and 8B, the axial length of the bushing 890 can be greater than the axial length of the post portion 854. As shown in FIGS. 8A and 8B, the post portion 854 includes an end 855, which may be received in a socket 891 of the bushing 890.

As shown in FIGS. 8A and 8B, the bushing 890 includes an inner surface 894, an outer surface 896 and opposing ends 897 and 899 where the inner surface 894 defines, at least in part, the socket 891. As an example, the post portion 854 of the vane 850 can include an outer radius that is less than an inner radius of the inner surface 894 such that at least a portion of the post portion 854 can be received by the socket 891.

In the example of FIGS. 8A and 8B, the bushing 890 includes at least one keyway 893 at or adjacent to the end 899 of the bushing 890 (e.g., at or proximate to an end of the socket 891). Further, the vane 850 includes at least one respective matching key 861. As shown, the vane 850 includes two keys 861 and two flats 863.

As mentioned, a vane may be movable via a post being operatively coupled to a vane control arm. In the example of FIGS. 8A and 8B, the bushing 890 can be operatively coupled to a vane control arm where rotation of the vane control arm causes the bushing 890 to rotate. In such an example, where a key and keyway of a vane and a bushing (e.g., or a bushing and a vane) are engaged, torque may be transmitted via such a coupling. In the example of FIGS. 8A and 8B, rotation of the bushing 890 can cause the vane 850 to rotate via the key/keyway 861/893 coupling (e.g., the key 861 being received in the keyway 893).

As an example, the bushing 890 can be made of an alloy that includes nickel as a predominant individual constituent such as, for example, an INCONEL material, a René material, WASPALOY® material, etc. As an example, the vane may be made of a different material.

Figure 9A:
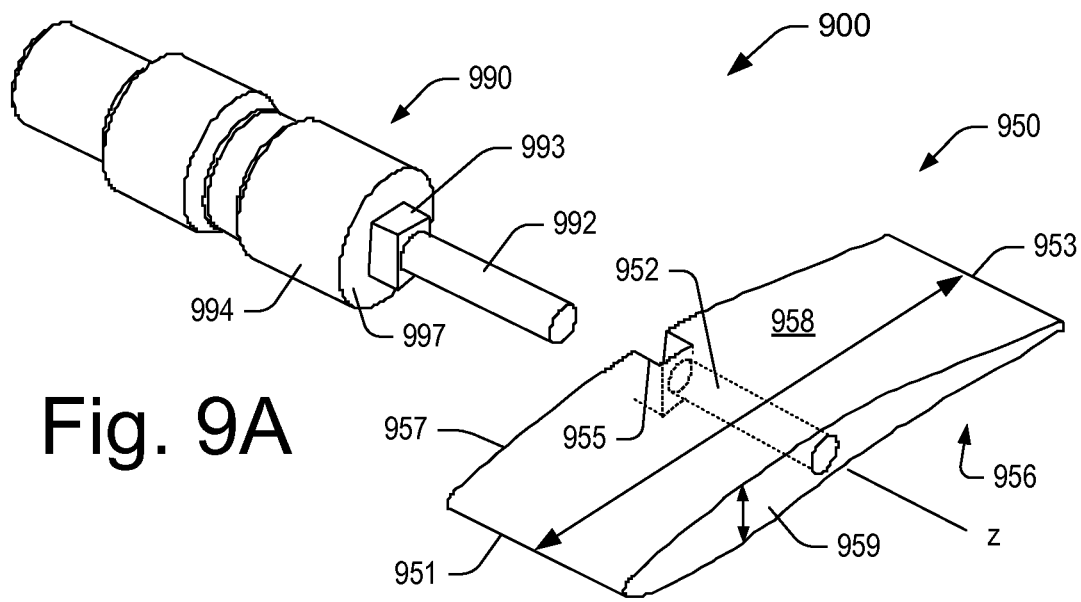
FIGS. 9A and 9B are series of views of an example of a vane assembly.
Figure 9B:
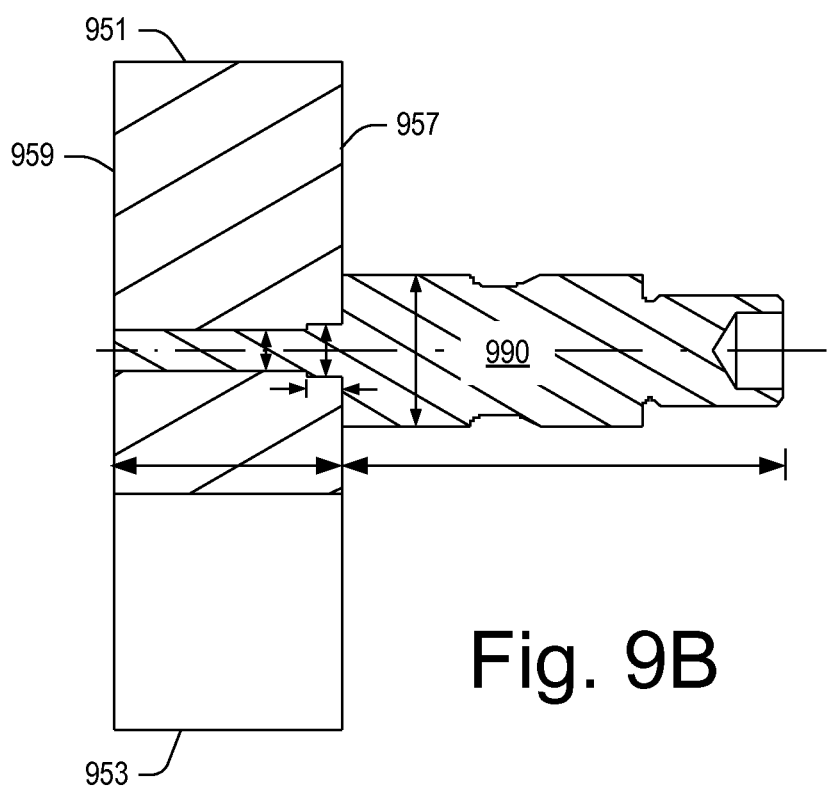

FIGS. 9A and 9B show an example of a vane assembly 900 that includes a vane 950 that includes a leading edge 951, a trailing edge 953, a suction side surface 956 and a pressure side surface 958 that meet at the leading edge 951 and the trailing edge 953. The vane 950 includes a planar lower surface 957 and a planar upper surface 959. The vane 950 can be defined by one or more parameters such as vane height (e.g., along the z-axis), vane length (e.g., chord length, etc.) and vane thickness. As an example, the vane 950 may be stacked, partially stacked or not stacked with respect to a series of cross-sectional profiles along the z-axis.

As shown in FIGS. 9A and 9B, the vane 950 includes a bore 952, which may be a partial bore or a through bore. The vane assembly 900 includes a post 990 that includes an extension 992 that can be received at least in part by the bore 952 of the vane 950. The post 990 can also include a key 993 that can be received by a keyway 955 of the vane 950. As shown in the example of FIGS. 9A and 9B, the post 990 includes a base portion 994 from which the key 993 and the extension 992 extend axially outwardly therefrom. As shown, the base portion 994 includes an axial face 997 which may, for example, abut the lower planar surface 957 of the vane 950.

As mentioned, a vane may be movable via a post being operatively coupled to a vane control arm. In the example of FIGS. 9A and 9B, the post 990 can be operatively coupled to a vane control arm where rotation of the vane control arm causes the post 990 to rotate. In such an example, where a key and keyway of a vane and a post (e.g., or a post and a vane) are engaged, torque may be transmitted via such a coupling. In the example of FIGS. 9A and 9B, rotation of the post 990 can cause the vane 950 to rotate via the key/keyway 993/955 coupling (e.g., the key 993 being received in the keyway 955).

As an example, at least a portion of the post 990 can be made of an alloy that includes nickel as a predominant individual constituent such as, for example, an INCONEL material, a René material, WASPALOY® material, etc. As an example, the vane may be made of a different material.

Figure 10A:
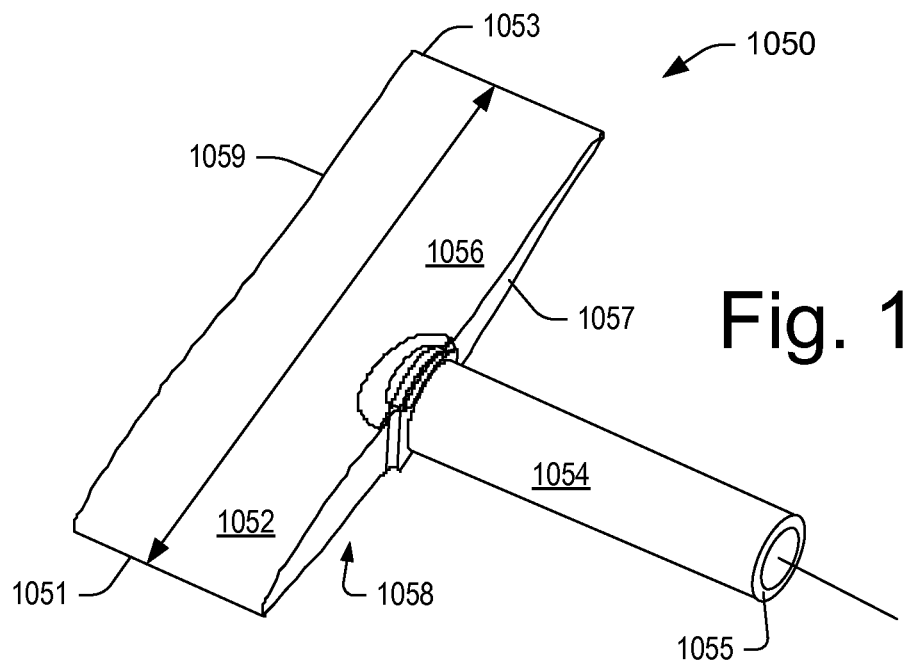
FIGS. 10A and 10B are series of views of an example of a vane assembly.
Figure 10B:
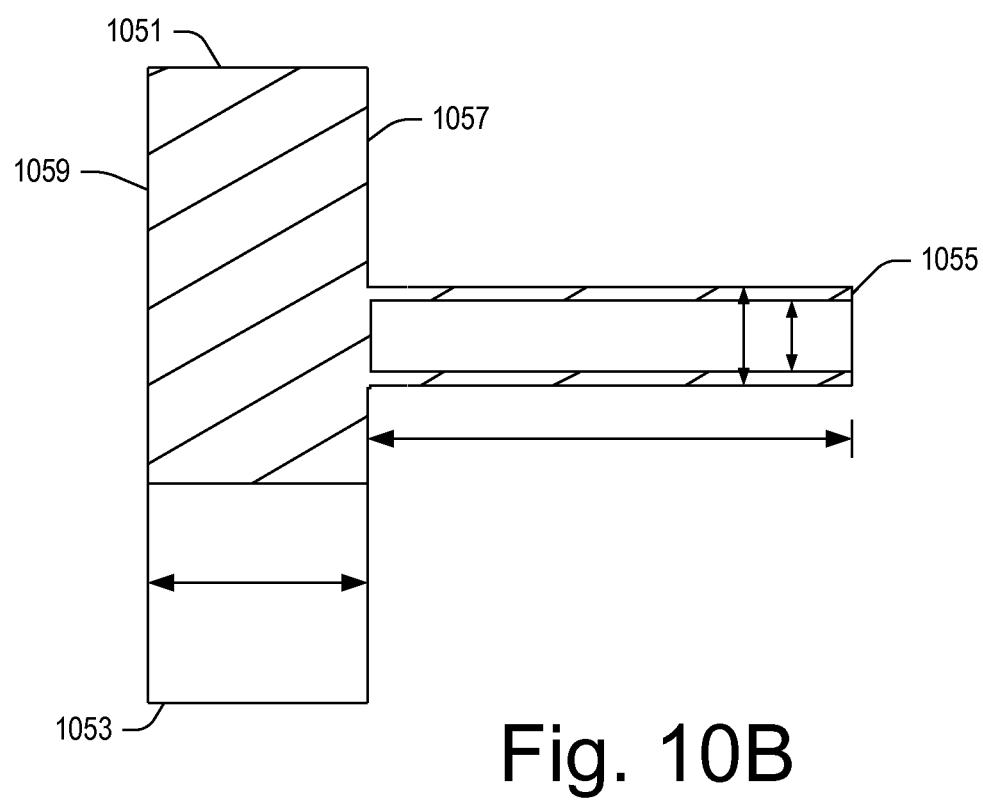

FIGS. 10A and 10B shows an example of a vane 1050 that includes a vane portion 1052 that includes a leading edge 1051, a trailing edge 1053, a suction side surface 1056 and a pressure side surface 1058 that meet at the leading edge 1051 and the trailing edge 1053. The vane 1050 includes a planar lower surface 1057 and a planar upper surface 1059. The vane portion 1052 can be defined by one or more parameters such as vane height (e.g., along the z-axis), vane length (e.g., chord length, etc.) and vane thickness. As an example, the vane portion 1052 may be stacked, partially stacked or not stacked with respect to a series of cross-sectional profiles along the z-axis.

As shown in FIGS. 10A and 10B, the vane 1050 includes the vane portion 1052 and a post portion 1054. As shown in FIGS. 10A and 10B, the post portion 1054 includes an end 1055, which may include one or more features for coupling to a vane control arm, for facilitating assembly, etc.

As shown in FIGS. 10A and 10B, the post portion 1054 can be at least in part hollow. For example, the post portion 1054 can include a bore that extends axially to about the lower planar surface 1057 of the vane portion 1052. In such an example, the mass of the vane 1050 may be reduced. As an example, such a reduction in mass may reduce cost of material used to form the vane 1050.

As an example, the vane 1050 can be made of an alloy that includes nickel as a predominant individual constituent such as, for example, an INCONEL material, a René material, WASPALOY® material, etc.

As an example, the bore of the post portion 1054 of the example vane 1050 of FIGS. 10A and 10B may optionally be filled with a material, for example, during a pouring process. In such an example, the fill material may include a lesser amount of nickel by mass than the material used to form the post portion 1054.

Figure 11A:
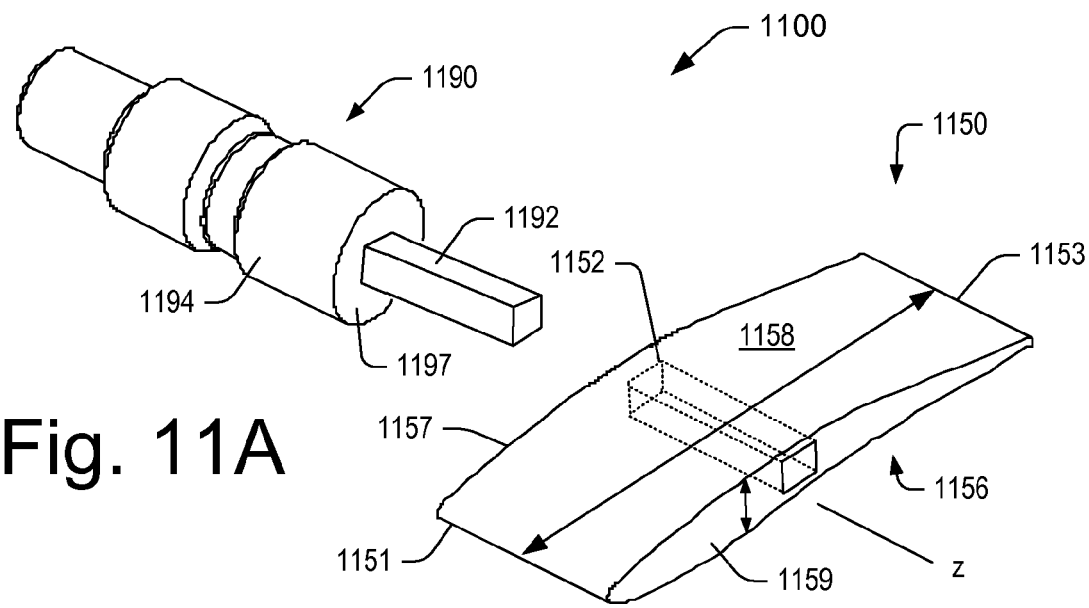
FIGS. 11A and 11B are series of views of an example of a vane assembly.
Figure 11B:
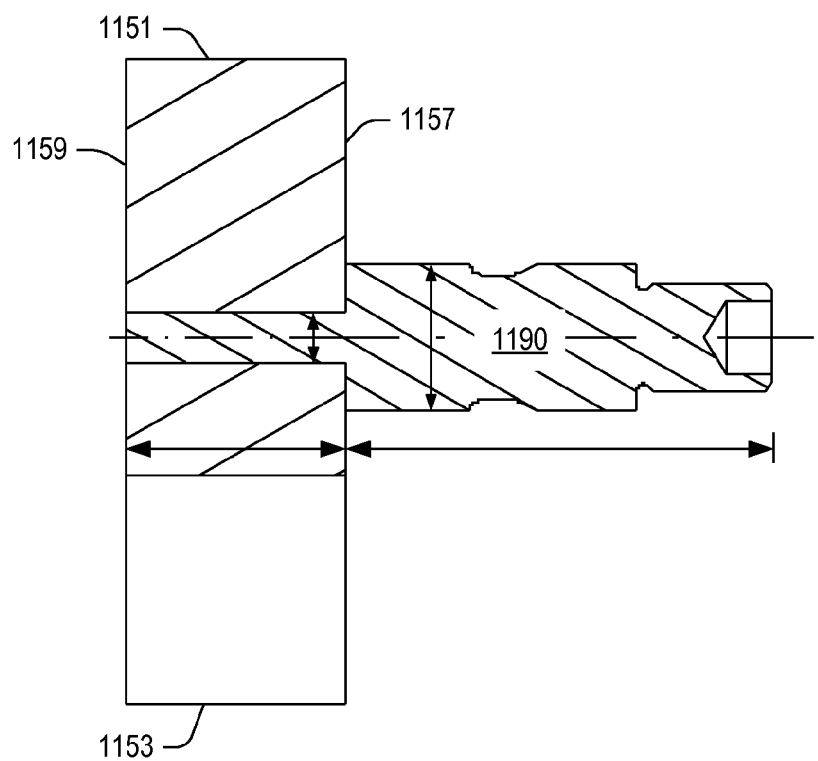

FIGS. 11A and 11B show an example of a vane assembly 1100 that includes a vane 1150 that includes a leading edge 1151, a trailing edge 1153, a suction side surface 1156 and a pressure side surface 1158 that meet at the leading edge 1151 and the trailing edge 1153. The vane 1150 includes a planar lower surface 1157 and a planar upper surface 1159. The vane 1150 can be defined by one or more parameters such as vane height (e.g., along the z-axis), vane length (e.g., chord length, etc.) and vane thickness. As an example, the vane 1150 may be stacked, partially stacked or not stacked with respect to a series of cross-sectional profiles along the z-axis.

As shown in FIGS. 11A and 11B, the vane 1150 includes a bore 1152, which may be a partial bore or a through bore. The vane assembly 1100 includes a post 1190 that includes an extension 1192 that can be received at least in part by the bore 1152 of the vane 1150. The post 1190 can also be shaped to act as a key that can be received by at least a portion of the bore 1152 that is shaped as a keyway. As shown in the example of FIG. 11, the post 1190 includes a base portion 1194 from which the extension 1192 extends axially outwardly therefrom. As shown, the base portion 1194 includes an axial face 1197 which may, for example, abut the lower planar surface 1157 of the vane 1150.

As mentioned, a vane may be movable via a post being operatively coupled to a vane control arm. In the example of FIGS. 11A and 11B, the post 1190 can be operatively coupled to a vane control arm where rotation of the vane control arm causes the post 1190 to rotate. In such an example, where a key and keyway of a vane and a post (e.g., or a post and a vane) are engaged, torque may be transmitted via such a coupling. In the example of FIGS. 11A and 11B, rotation of the post 1190 can cause the vane 1150 to rotate via post 1192 and bore 1152 coupling (e.g., via a key being received in a keyway or the post and bore otherwise being operatively coupled).

As an example, at least a portion of the post 1190 can be made of an alloy that includes nickel as a predominant individual constituent such as, for example, an INCONEL material, a René material, WASPALOY® material, etc. As an example, the vane may be made of a different material.

Figure 12A:
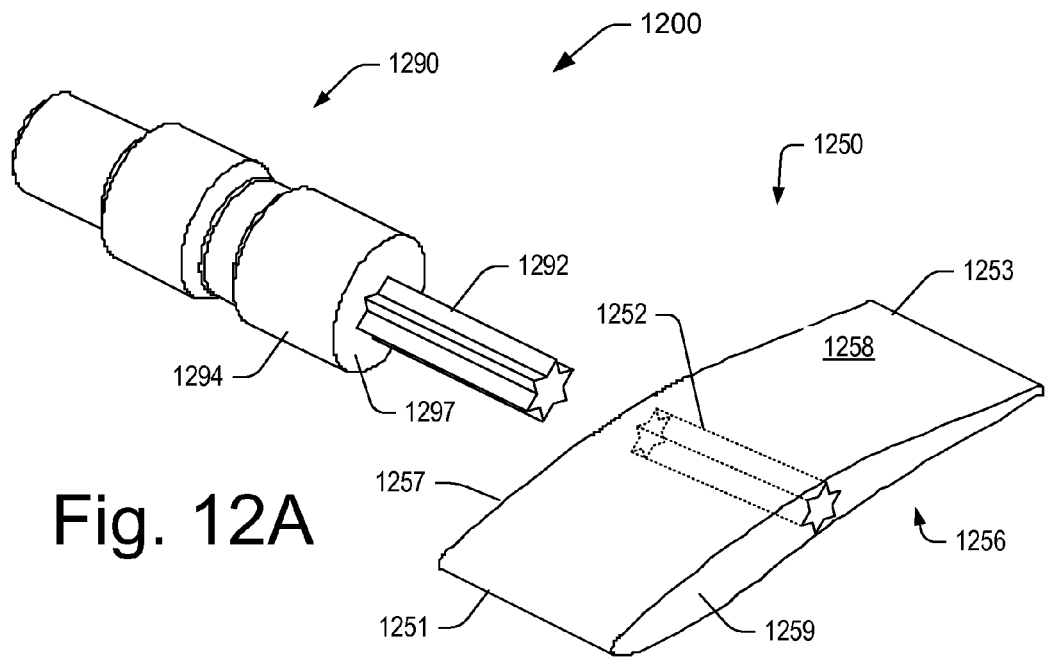
FIGS. 12A and 12B are series of views of an example of a vane assembly.
Figure 12B:
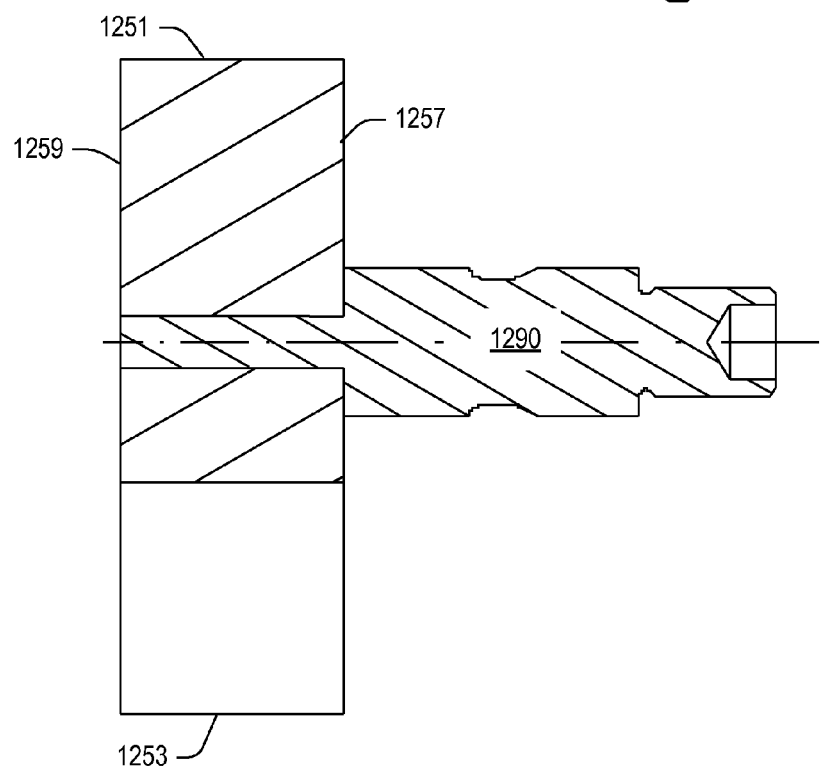

FIGS. 12A and 12B show an example of a vane assembly 1200 that includes a vane 1250 that includes a leading edge 1251, a trailing edge 1253, a suction side surface 1256 and a pressure side surface 1258 that meet at the leading edge 1251 and the trailing edge 1253. The vane 1250 includes a planar lower surface 1257 and a planar upper surface 1259. The vane 1250 can be defined by one or more parameters such as vane height (e.g., along the z-axis), vane length (e.g., chord length, etc.) and vane thickness. As an example, the vane 1250 may be stacked, partially stacked or not stacked with respect to a series of cross-sectional profiles along the z-axis.

As shown in FIGS. 12A and 12B, the vane 1250 includes a bore 1252, which may be a partial bore or a through bore. The vane assembly 1200 includes a post 1290 that includes an extension 1292 that can be received at least in part by the bore 1252 of the vane 1250. The post 1290 can also be shaped to act as a key that can be received by at least a portion of the bore 1252 that is shaped as a keyway. As shown in the example of FIGS. 12A and 12B, the post 1290 includes a base portion 1294 from which the extension 1292 extends axially outwardly therefrom. As shown, the base portion 1294 includes an axial face 1297 which may, for example, abut the lower planar surface 1257 of the vane 1250.

As mentioned, a vane may be movable via a post being operatively coupled to a vane control arm. In the example of FIGS. 12A and 12B, the post 1290 can be operatively coupled to a vane control arm where rotation of the vane control arm causes the post 1290 to rotate. In such an example, where a key and keyway of a vane and a post (e.g., or a post and a vane) are engaged, torque may be transmitted via such a coupling. In the example of FIGS. 12A and 12B, rotation of the post 1290 can cause the vane 1250 to rotate via post 1292 and bore 1252 coupling (e.g., via a key being received in a keyway or the post and bore otherwise being operatively coupled).

As an example, at least a portion of the post 1290 can be made of an alloy that includes nickel as a predominant individual constituent such as, for example, an INCONEL material, a René material, WASPALOY® material, etc. As an example, the vane may be made of a different material.

Figure 13A:
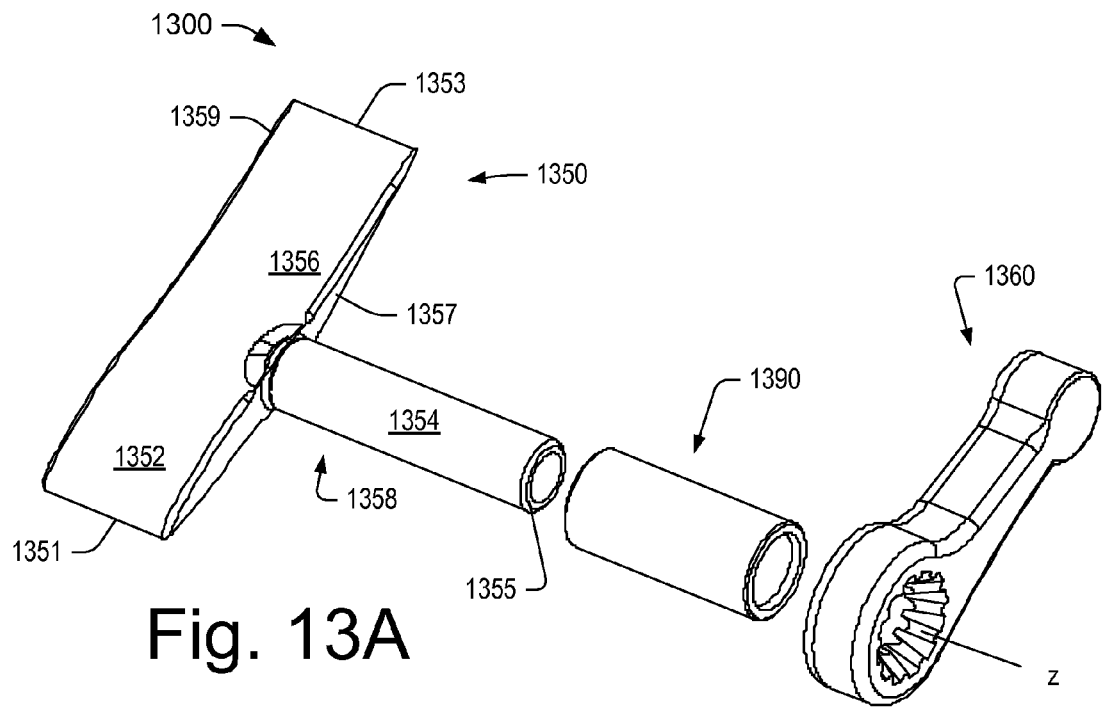
FIGS. 13A and 13B are series of views of an example of a vane assembly.
Figure 13B:
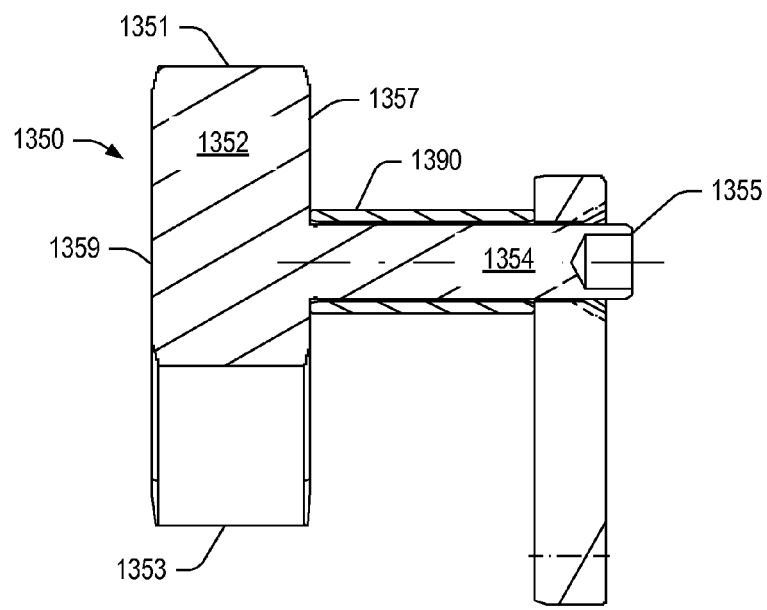

FIGS. 13A and 13B show an example of a vane assembly 1300 that includes a vane 1350 that includes a leading edge 1351, a trailing edge 1353, a suction side surface 1356 and a pressure side surface 1358 that meet at the leading edge 1351 and the trailing edge 1353. The vane 1350 includes a planar lower surface 1357 and a planar upper surface 1359. The vane 1350 can be defined by one or more parameters such as vane height (e.g., along the z-axis), vane length (e.g., chord length, etc.) and vane thickness. As an example, the vane 1350 may be stacked, partially stacked or not stacked with respect to a series of cross-sectional profiles along the z-axis.

As shown in FIGS. 13A and 13B, the vane 1350 includes a vane portion 1352 and a post portion 1354. The vane assembly 1300 includes a vane control arm 1360 and a bushing 1390 that includes an inner radius that is greater than an outer radius of the post portion 1354 and that includes an outer radius that defines a radial bushing wall thickness with respect to the inner radius. As shown in FIGS. 13A and 13B, the axial length of the bushing 1390 can be less than the axial length of the post portion 1354. As shown in FIGS. 13A and 13B, the post portion 1354 includes an end 1355, which may include one or more features for coupling to the vane control arm 1360, for facilitating assembly, etc.

In the example of FIGS. 13A and 13B, the axial length of the bushing 1390 may be define a distance between the lower planar surface 1357 of the vane portion 1352 of the vane 1350 and the vane control arm 1360.

As an example, the bushing 1390 can be made of an alloy that includes nickel as a predominant individual constituent such as, for example, an INCONEL material, a René material, WASPALOY® material, etc. As an example, the vane may be made of a different material and the vane control arm may be made of a different material (e.g., that differs from that of the bushing 1390).

As an example, a post (e.g., a stem) to a bushing may be interference fit, for example, to provide torque transmission. As an example, an interference fit may include a cold press fit, a hot shrink fit, etc. As an example, where a clearance exists between a post and a bushing, a riveting process can cause the post and bushing to become tight, for example, consider an arm riveting process where a control arm is riveted (see, e.g., FIG. 13A). As an example, the vane control arm 1360 can be fixed in place by riveting the end of the post 1355 such that material spreads onto locking splines on the vane control arm 1360 (e.g., close to the z axis indicator in FIG. 13A), which can effectively provide for torque transfer. As an example, during a riveting process, the vane control arm 1360 can be configured to lock the bushing 1390 in position between the vane control arm 1360 and the vane surface 1357. As an example, some material flow/swelling during riveting may also close up a clearance between the post 1354 and the bushing internal diameter (e.g., to some extent, which may or may not be over a full length of the bushing 1390).

As an example, a method can include riveting of a vane control arm in a manner that holds a bushing tight axially. As an example, during a riveting operation, a load may be applied on a vane that can create vane axis growth where the growth can catch-up a clearance between a bushing and a vane control arm.

Figure 14A:
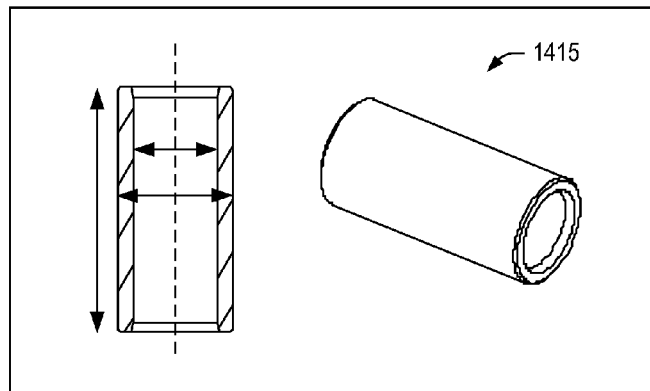
FIGS. 14A and 14B are views of an example of a bushing and an example of an assembly.
Figure 14B:
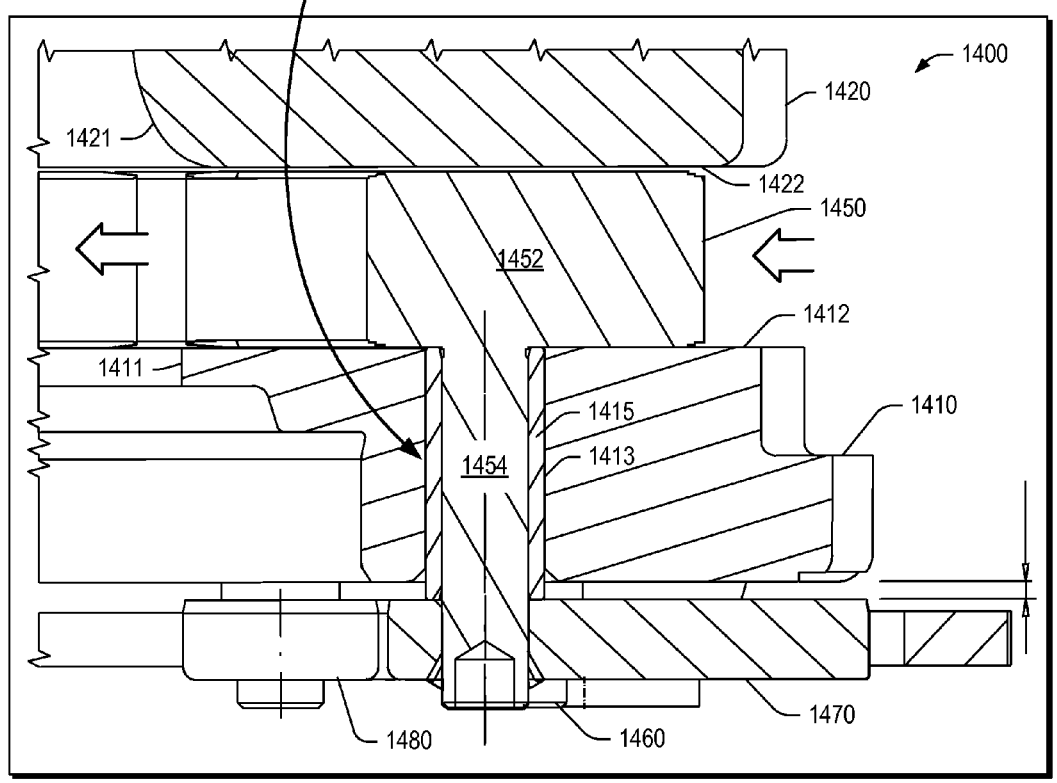

FIGS. 14A and 14B show an example of a bushing 1415 and an example of a portion of an assembly 1400. The assembly 1400 can be a cartridge, which may include one or more features of a cartridge such as, for example, the cartridge 250. As shown in FIG. 14A, the cartridge 1400 includes an annular component 1410 with a surface 1411 that defines a central opening for receipt of at least a portion of a turbine wheel, an annular surface 1412, and a bore surface 1413 that defines a bore that extends from the annular surface 1412 axially downwardly through the annular component 1410. As shown in FIG. 14A, the cartridge 1400 includes a shroud component 1420 that includes a shroud surface 1421 and an annular surface 1422 that extends radially outwardly away from the shroud surface 1421 and that, in combination with the annular surface 1412 of the annular component 1410, defines an annular nozzle space in which at least a portion 1452 of a vane 1450 is disposed.

As shown, the vane 1450 includes a vane post 1454 and a vane control arm 560 is operatively coupled to the vane post 554 and operatively coupled to a unison ring 570 that can be guided by a pin 580, which may be a rotating pin (e.g., a wheel portion rotatable about an axle).

As shown in FIGS. 14A and 14B, a bushing 1415 can be disposed at least in part in the annular component 1410 such that an outer surface of the bushing 1415 is in contact with the bore surface 1413. The bushing 1415 can include a through bore defined at least in part by an inner surface. As an example, the bushing 1415 can be cylindrical in shape with a cylindrical through bore that can receive a vane post where a clearance exists between an inner surface of the bushing 1415 and an outer surface of the post such that the post can rotate within the bushing 1415. In such an example, the bushing 1415 can be fixed to the annular component 1410. As an example, the bushing 1415 can be interference fit into a bore defined by the bore surface 1413 of the annular component 1410.

As an example, the bushing 1415 may be welded into the annular component 1410. As an example, a bushing can include a key and/or a keyed outer surface that is received at least in part by a keyway of an annular component. As an example, a bushing can include a keyway and an annular component can include a key that can be received at least in part by the keyway. As an example, a bushing can include at least one key and at least one keyway and an annular component can include at least one keyway and at least one key. In such an example, the bushing may be received at least in part by an opening of the annular component where key/keyway engagement occurs to rotatably fix the bushing in the annular component. As an example, a bushing with at least one of a key and a keyway can be interference fit into corresponding key and/or keyway associated with a bore of an annular component.

As an example, a bushing may be made of a material that differs from a material of an annular component. For example, a bushing can be made of a material and an annular component can be made of a material where the nickel content of the bushing material exceeds the nickel content of the annular component material. In such an example, a vane can include a vane post made of a material that has a nickel content that is less than the nickel content of the bushing material and, for example, the vane material can differ from the annular component material. As an example, consider a bushing made of an INCONEL@ alloy, a vane made of an HK30 alloy and an annular component made of a PL23 alloy.

Figure 15:
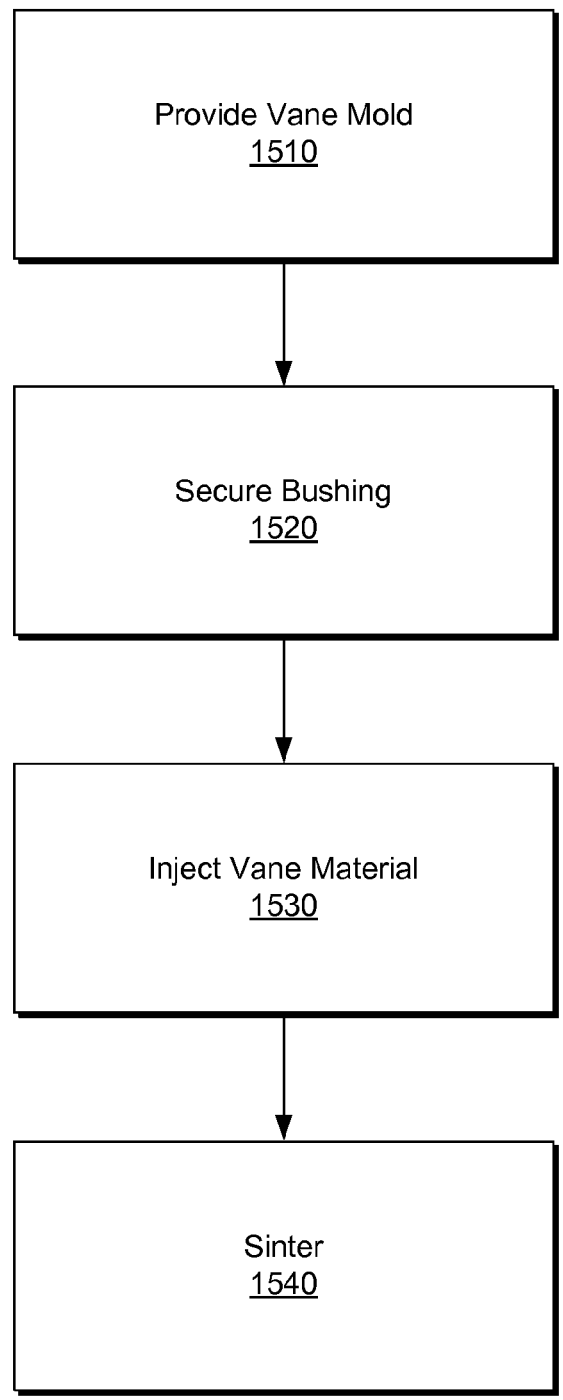
FIG. 15 is a block diagram of an example of a method.

FIG. 15 shows an example of a method 1500 that includes a provision block 1510 for providing a vane mold, a secure block 1520 for securing a bushing with respect to the vane mold (e.g., positioning a bushing with respect to a vane mold), an injection block 1530 for injecting vane material into the vane mold and into at least a portion of a bore space of the bushing, and a sinter block 1540 for sintering the vane material where the sintering includes binding the bushing to the vane material.

As an example, the method 1500 of FIG. 15 can include metal injection molding (MIM). MIM can be considered to be a metalworking process. MIM can include mixing powdered metal binder material to form a feedstock (e.g., a mixture) that can be used in injection mold forming. As an example, one or more operations may be performed on a molded shape, for example, where binder material is removed and the metal particles are coalesced into the desired state (e.g., for a metal alloy). As an example, an operation can be or include a sintering operation.

As an example, an MIM process can include combining metallic powders (e.g., metal, alloy, metal and alloy, etc.) with one or more binders (e.g., wax, plastic, etc.) to produce a feedstock mixture that can be injected as a flowable material into a hollow mold, for example, using a plastic injection molding machine. As an example, a green part can be formed that can be cooled and de-molded. The de-molded part may be subject to a process where at least a portion of the binder material is removed. As an example, a process can include utilization of one or more of solvent, a thermal furnace, a catalyst, etc.

As an example, MIM can include generating a "brown" stage material by removal of at least a portion of binder where the brown stage material may be porous. As an example, MIM can include sintering. For example, a shaped form (e.g., brown stage or other) may be sintered at a sintering temperature(s) at which metal and/or alloy particle surfaces bind together to form a component that can be, for example, about 96 to about 99% solid (e.g., compared to a solid density being 100%). Such a component may be subjected to one or more additional processes such as, for example, one or more of machining, plating, passivating, annealing, carburizing, nitriding, precipitation hardening, etc.

As an example, nitriding can diffuse nitrogen in to a material via a surface of the material. As an example, nitriding may be used on low-carbon, low-alloy steels, medium and high-carbon steels, titanium, aluminum, molybdenum, etc.

Figure 16:
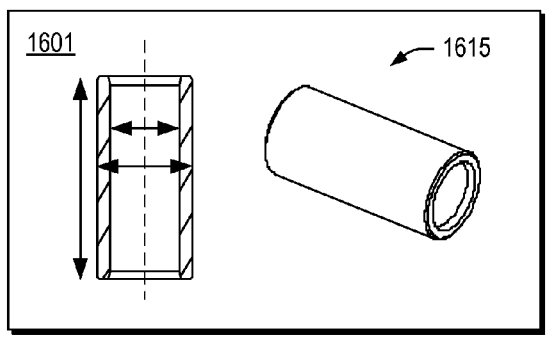
FIG. 16 is a series of approximate views of an example of a method for making an example of a vane from different materials.
Figure 16:
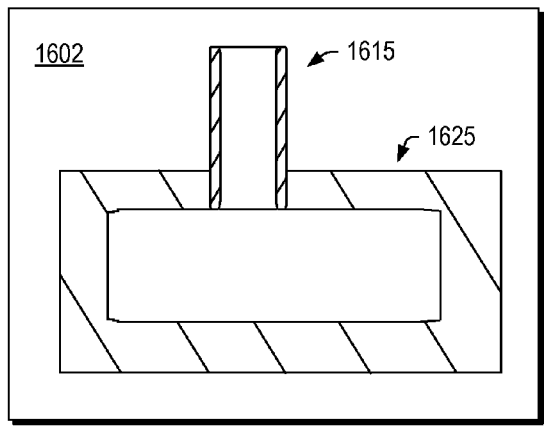
Figure 16:
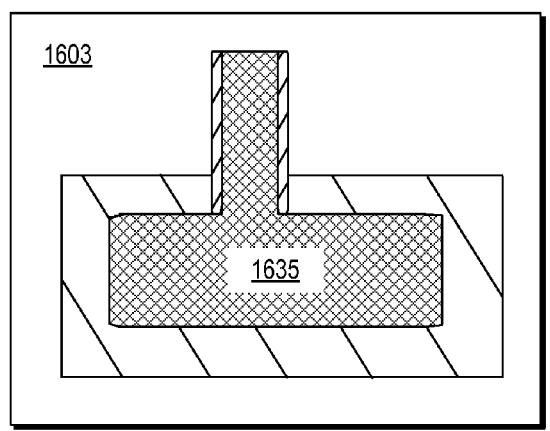
Figure 16:
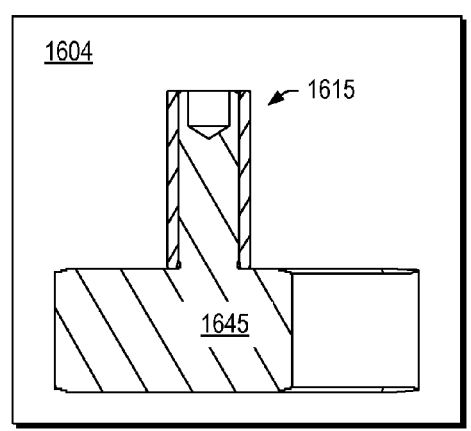

FIG. 16 shows various approximate views of an example of a method 1600 for making an example of a vane 1645 from different materials. As shown, in a provision block 1601, the method 1600 can include providing a bushing 1615 that is made of a first material. As shown in a positioning block 1602, the bushing 1615 can be positioned with respect to a mold 1625 for a vane. In an injection block 1603, a second material 1635 that differs in its composition from the first material (e.g., the second material 1635 being of a lesser nickel content) can be injected into a chamber of the mold 1625. One or more processes may be performed on the second material 1635 as in contact with the first material of the bushing 1615 to form a part as shown in a formation block 1604 where the part includes at least a vane portion 1645 that is bonded to the bushing 1615.

As an example, a method can include performing a so-called Metal Injection Molding (MIM) process where one or more metals, one or more alloys, etc. may be used. As an example, a bushing can be made as a separate component and can be held in an MIM tool prior to injection of material into a MIM mold. In such an example, the MIM mold can be shaped to form the vane profile and the hollow bushing can also be filled with material (e.g., optionally simultaneously, sequentially, etc.) during an MIM injection process. As an example, the bushing and the vane stem (e.g., vane post) can be bound together during a metal and/or alloy powder sintering part of the MIM process.

As an example, a hollow bushing can include a circular inner diameter. As an example, a bushing can include a square inner profile that can provide a key to better transmit torque, etc. As an example, such a bushing may be utilized in an MIM process where the square inner profile may be filled with material during the MIM process. While a square profile is mentioned, a key/keyway type of profile may be utilized. For example, consider an oval shape, a star shape, etc., where complementary profiles (e.g., at least in part complementary) do not rotate with respect to one another as would a circle in a circle.

As an example, an exhaust gas variable geometry turbine assembly can include a shroud component that includes an inner perimeter, an outer perimeter and a shroud component surface that extends from the inner perimeter to the outer perimeter; an annular component that includes an inner perimeter, an outer perimeter, an annular component surface that extends from the inner perimeter to the outer perimeter, a number of bore openings disposed in the annular component surface and a corresponding number of bores; at least one spacer that defines a nozzle height of an exhaust gas nozzle defined by a planar portion of the shroud component surface and a planar portion of the annular component surface; and a number of pivotable vanes that define throats within the exhaust gas nozzle where each of the pivotable vanes includes a corresponding post that is received at least in part by a corresponding one of the bores of the annular component, where each of the pivotable vanes includes a first alloy that includes a first amount of nickel by mass, where each of the corresponding posts includes a second alloy that includes a second amount of nickel by mass and where the second amount of nickel by mass exceeds the first amount of nickel by mass. In such an example, the first alloy can include less than approximately 30 percent nickel by mass and/or the second alloy can include at least approximately 40 percent nickel by mass. As an example, a first alloy can include at least approximately 50 percent iron by mass.

As an example, a post can be an integral portion of a corresponding pivotable vane. As an example, a post can be interference fit to a corresponding pivotable vane.

As an example, a post can include an extension that is received by a bore of a corresponding pivotable vane. As an example, an extension can include a key and a bore of a pivotable vane can include a corresponding keyway (e.g., or vice versa).

As an example, a post can include a post bore formed at least in part by a second alloy where a pivotable vanes includes a first alloy that includes a first amount of nickel by mass, where the post includes the second alloy that includes a second amount of nickel by mass and where the second amount of nickel by mass exceeds the first amount of nickel by mass. In such an example, a post bore can include a material disposed therein that differs from the second alloy.

As an example, an exhaust gas variable geometry turbine assembly can include a shroud component that includes an inner perimeter, an outer perimeter and a shroud component surface that extends from the inner perimeter to the outer perimeter; an annular component that includes an inner perimeter, an outer perimeter, an annular component surface that extends from the inner perimeter to the outer perimeter, a number of bore openings disposed in the annular component surface and a corresponding number of bores; at least one spacer that defines a nozzle height of an exhaust gas nozzle defined by a planar portion of the shroud component surface and a planar portion of the annular component surface; a number of pivotable vanes that define throats within the exhaust gas nozzle where each of the pivotable vanes includes a corresponding post that is received at least in part by a corresponding one of the bores of the annular component; and a number of bushings where each of the bushings is operatively coupled to a corresponding one of the pivotable vanes or operatively coupled to the annular component where each of the pivotable vanes includes a first alloy that includes a first amount of nickel by mass, where each of the corresponding bushings includes a second alloy that includes a second amount of nickel by mass and where the second amount of nickel by mass exceeds the first amount of nickel by mass. In such an example, the first alloy can include less than approximately 30 percent nickel by mass and/or the second alloy can include at least approximately 40 percent nickel by mass. As an example, the first alloy can include at least approximately 50 percent iron by mass.

As an example, a bushing can include a post extension that includes a socket that operatively couples to corresponding posts of a pivotable vane. As an example, a bushing can include a key or a keyway that operatively engages a keyway or a key of a corresponding vane.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An exhaust gas variable geometry turbine assembly comprising:
   an actuator;
   vane control arms operatively coupled to the actuator;
   a shroud component that comprises an inner perimeter, an outer perimeter and a shroud component surface that extends from the inner perimeter to the outer perimeter;
   an annular component made from an alloy that comprises nickel wherein the annular component comprises an inner perimeter, an outer perimeter, an annular component surface that extends from the inner perimeter to the outer perimeter, a number of bore openings disposed in the annular component surface and a corresponding number of bores wherein each of the bore openings comprises a bore surface;
   at least one spacer that defines a nozzle height of an exhaust gas nozzle defined by a planar portion of the shroud component surface and a planar portion of the annular component surface; and
   a number of pivotable vanes that define throats within the exhaust gas nozzle wherein each of the pivotable vanes comprises a corresponding post portion that comprises a bushing that is received at least in part by a corresponding one of the bores of the annular component and contacts a corresponding bore surface wherein each of the pivotable vanes couples to a corresponding one the vane control arms for pivoting thereof responsive to force applied by the actuator, wherein each of the pivotable vanes comprises a first alloy that comprises a first amount of nickel by mass that is greater than 18 percent nickel by mass and less than 30 percent nickel by mass, wherein each of the corresponding bushings comprises a second alloy that reduces susceptibility to sticking between the bushings and the bore surfaces and that comprises a second amount of nickel by mass that is greater than 40 percent nickel by mass, and wherein each of the bushings is fixed to a corresponding one of the pivotable vanes.

2. The exhaust gas variable geometry turbine assembly of claim 1 wherein the first alloy comprises at least 50 percent iron by mass.

3. The exhaust gas variable geometry turbine assembly of claim 1 wherein each of the bushings comprises a key or a keyway that operatively engages a keyway or a key of the post portion of a corresponding one of the pivotable vanes.

4. An exhaust gas variable geometry turbine assembly comprising:
   a shroud component that comprises an inner perimeter, an outer perimeter and a shroud component surface that extends from the inner perimeter to the outer perimeter;
   an annular component made from an alloy that comprises nickel wherein the annular component comprises an inner perimeter, an outer perimeter, an annular component surface that extends from the inner perimeter to the outer perimeter, a number of bore openings disposed in the annular component surface and a corresponding number of bores;
   at least one spacer that defines a nozzle height of an exhaust gas nozzle defined by a planar portion of the shroud component surface and a planar portion of the annular component surface;
   a number of pivotable vanes that define throats within the exhaust gas nozzle; and
   a number of bushings wherein each of the bushings is operatively coupled to the annular component and disposed in a respective one of the bores of the annular component, wherein each of the pivotable vanes comprises a corresponding post that is received at least in part by a corresponding one of the bushings, wherein each of the pivotable vanes comprises a first alloy that comprises a first amount of nickel by mass that is greater than 18 percent nickel by mass and less than 30 percent nickel by mass, and wherein each of the corresponding bushings comprises a second alloy that reduces susceptibility to sticking between the bushings and the posts and that comprises a second amount of nickel by mass that is greater than 40 percent nickel by mass.

* * * * *